US009610516B2

(12) United States Patent
Gairns et al.

(10) Patent No.: US 9,610,516 B2
(45) Date of Patent: Apr. 4, 2017

(54) SYSTEM, DEVICE AND METHOD FOR CONTROLLING EFFECTS IN A THEATRE

(71) Applicant: SimEx Inc., Toronto (CA)

(72) Inventors: David Gairns, Toronto (CA); Gabi Hoffknecht, Newmarket (CA)

(73) Assignee: SIMEX INC., Toronto (CA)

(*) Notice: Subject to any disclaimer, the term of this patent is extended or adjusted under 35 U.S.C. 154(b) by 777 days.

(21) Appl. No.: 13/842,689

(22) Filed: Mar. 15, 2013

(65) Prior Publication Data

US 2014/0267903 A1 Sep. 18, 2014

(51) Int. Cl.
*A63J 25/00* (2009.01)
*G03B 21/00* (2006.01)
*G03B 21/32* (2006.01)
*A63J 5/00* (2006.01)

(52) U.S. Cl.
CPC ............ *A63J 25/00* (2013.01); *G03B 21/003* (2013.01); *G03B 21/32* (2013.01); *A63J 2005/002* (2013.01); *A63J 2005/003* (2013.01); *A63J 2005/007* (2013.01); *A63J 2005/008* (2013.01)

(58) Field of Classification Search
CPC .......... G03B 21/003; G03B 21/32; A63J 5/00; A63J 2005/001
USPC ..................... 352/3, 40, 48, 39, 85
See application file for complete search history.

(56) References Cited

U.S. PATENT DOCUMENTS 3,628,829 A * 12/1971 Heilig ...................... A47C 1/12
  297/180.14

| 3,973,839 A | * | 8/1976 | Stumpf | ................... | G03B 29/00 |
| | | | | | 352/10 |
| 4,838,344 A | * | 6/1989 | Murakami | .............. | F24F 3/044 |
| | | | | | 165/48.1 |
| 4,919,197 A | * | 4/1990 | Murakami | .............. | F24F 3/044 |
| | | | | | 165/48.1 |
| 5,026,152 A | * | 6/1991 | Sharkey | ................... | A63J 25/00 |
| | | | | | 352/43 |
| 5,433,670 A | * | 7/1995 | Trumbull | ............... | A63G 31/16 |
| | | | | | 352/85 |

(Continued)

FOREIGN PATENT DOCUMENTS

WO 2013125775 A1 8/2013

OTHER PUBLICATIONS

Medialon, Stunt Show Case Study, webpages from http://www.medialon.com/co/file-stunt_show_casestudy_e3.aspx.

(Continued)

*Primary Examiner* — William C Dowling
(74) *Attorney, Agent, or Firm* — Bereskin & Parr LLP/S.E.N.C.R.L., s.r.l

(57) ABSTRACT

Some embodiments of the present disclosure provide a system for controlling a physical effect in a theater, the system comprising: an audio/video (A/V) component, the A/V component being capable of processing A/V media that is associated with data indicating when the physical effect should be activated; a show control device communicably linked to the A/V component, the show control device being capable of translating the data into one or more signals that are capable of causing the physical effect to be activated; and a control assembly communicably linked to the show control device, the control assembly capable of receiving the one or more signals and activating the physical effect in response.

25 Claims, 13 Drawing Sheets

(56) References Cited

U.S. PATENT DOCUMENTS

| | | | | |
|---|---|---|---|---|
| 5,765,314 A * | 6/1998 | Giglio | ............ | E04H 3/22 |
| | | | | 472/75 |
| 5,963,302 A * | 10/1999 | Wittek | ............ | A61L 9/125 |
| | | | | 352/38 |
| 6,152,829 A * | 11/2000 | Jaidka | ............ | A63J 5/02 |
| | | | | 472/65 |
| 7,065,418 B2 | 6/2006 | Standard et al. | | |
| 8,287,394 B2 | 10/2012 | Gil et al. | | |
| 8,307,388 B2 * | 11/2012 | Igoe | ............ | H04L 12/2809 |
| | | | | 348/460 |
| 8,804,093 B2 * | 8/2014 | Haight | ............ | A47C 1/12 |
| | | | | 297/217.4 |
| 2005/0015816 A1 * | 1/2005 | Christofalo | ............ | H04N 7/165 |
| | | | | 725/136 |
| 2008/0043204 A1 * | 2/2008 | Guo | ............ | G03B 21/32 |
| | | | | 352/85 |
| 2009/0106660 A1 * | 4/2009 | Naylor | ............ | G03B 21/52 |
| | | | | 715/731 |
| 2011/0041062 A1 * | 2/2011 | Singer | ............ | G06Q 30/02 |
| | | | | 715/730 |
| 2011/0319180 A1 | 12/2011 | Lee | | |
| 2012/0281138 A1 * | 11/2012 | Choi | ............ | H04N 21/235 |
| | | | | 348/460 |
| 2014/0340647 A1 * | 11/2014 | Kim | ............ | E04H 3/22 |
| | | | | 352/40 |
| 2014/0354954 A1 * | 12/2014 | Kim | ............ | E04H 3/22 |
| | | | | 352/10 |

OTHER PUBLICATIONS

Medialon, Showmaster Pro Mark II, webpages from http://www.medialon.com/pr/showmaster_pro_mark_ii.aspx.

* cited by examiner

SYSTEM, DEVICE AND METHOD FOR CONTROLLING EFFECTS IN A THEATRE

FIELD

The described embodiments relate to show control devices, and more particularly, show control devices for controlling effects in a theatre.

INTRODUCTION

Show control devices can control the effects that are provided in a theatre. For example, a show control device situated in a traditional theatre may control the activation of the speakers and/or projector(s) so as to control the audio and/or video (A/V) effects perceived by an audience.

Some customized theatres may provide effects that can stimulate audience members with a physical sensation synchronously with the A/V content being shown in the theatre. For example, these physical effects may include an air blast from a seat, or a scent release in the hall of the theatre. Theatres configured to provide physical effects of this nature may be considered to be providing "4-dimensional" (4D) media experiences (e.g., three-dimensional (3D) media, with the physical effects being the "fourth dimension").

Since 4D theatres are relatively costly to implement, they are often deployed as attractions at specialized entertainment locations such as science centers, amusement parks and/or theme parks. Attendance at these entertainment locations (and thus the theatre) may vary greatly depending on the season. For example, more people may visit the theatre during peak season (e.g., during summer holidays), and fewer people may visit the theatre during off-peak season.

Traditional show control devices, however, can typically only play a show in a fixed format, without being able to adjust the format of the show (e.g., alter the duration of the show) to suit how busy the theatre is.

Additionally, 4D theatres typically contain many more physical components to generate the various physical effects. For example, each seat in the theatre may be provided with mechanisms to provide air blast(s) or water squirt(s). To allow maintenance personnel to test that all these physical components are operational, traditional show control devices have been provided with controls to activate the physical effects directly. However, since the physical components for generating a physical effect can be located away from the show control device, it may be difficult for maintenance personnel to activate the physical effect and verify that that the physical effect is functioning properly at the same time.

This is thus a need for an improved show control device.

SUMMARY

In one aspect, some embodiments of the present disclosure provide a system for controlling a physical effect in a theatre. The system can include: an audio/video (A/V) component, the A/V component being capable of processing A/V media that is associated with data indicating when the physical effect should be activated; a show control device communicably linked to the A/V component, the show control device being capable of translating the data into one or more signals that are capable of causing the physical effect to be activated; and a control assembly communicably linked to the show control device, the control assembly capable of receiving the one or more signals and activating the physical effect in response.

In various embodiments, the physical effect may be generated by a pressurized source, and the control assembly can be a valve configured to release contents of the pressurized source in response to the one or more signals. In various embodiments, the contents of the pressurized source can be air or water.

In various embodiments, one or more signals sent from the show control device are adapted to release the contents of the pressurized source for a predetermined period of time, and the predetermined period of time is selected according to the physical effect.

In various embodiments, the physical effect is provided by a seat assembly capable of imparting motion to a subject seated on the seat assembly.

In various embodiments, the data indicates that the physical effect is to be activated in synchronization with the A/V media.

In another aspect, some embodiments of the present disclosure provide a show control device having a processor and a memory storing instructions which, when executed by the processor, cause the processor to: identify a plurality of media clips that are capable of being played in the theatre; provide a user interface that allows a first selection of the plurality of media clips to be included in a first show that is to be shown in the theatre; receive, via the user interface, input that indicates an order in which the first selection of media clips are to be played during the first show; and store data indicating that the first selection of media clips, when played in the indicated order, forms the first show that is to be shown in the theatre.

In various embodiments, the user interface is further configured to allow a second selection of the plurality of media clips to be included in a second show that is to be shown in the theatre. In various embodiments, the first selection and the second selection contain the same media clip, such that the same media clip is played when each of the first show and the second show is shown in the theatre.

In various embodiments, the processor is further configured to: provide a user interface that allows the first show to be selected, from a plurality of different shows, to be shown in the theatre.

In various embodiments, the processor is further configured to: identify a plurality of additional media clips that can be played during a loading period of the first show; and the user interface is further configured to allow selection of one or more of the additional media clips for playing during the loading period of the first show.

In various embodiments, the processor is further configured to: identify a plurality of additional media clips that can be played during an exiting period of the first show; and the user interface is further configured to allow selection of one or more of the additional media clips for playing during the exiting period of the first show.

In various embodiments, the processor is further configured to: identify a plurality of additional media clips that can be played when the first show is on standby; and the user interface is further configured to allow selection of one or more of the additional media clips for playing when the first show is on standby.

In various embodiments, the user interface is further configured to receive input indicating that there is a difference between the frame rates for any two media clips that are to be played consecutively during the first show.

In various embodiments, the theatre is capable of providing a physical effect, and at least one of the plurality of media clips is associated with data indicating when the physical effect should be activated. The physical effect can be one selected from a group consisting of: a water squirt, an air blast, and a scent release.

In another aspect, some embodiments of the present disclosure provide a method for facilitating creation of a show that is to be shown in a theatre. The method may include performing the steps of: identifying a plurality of media clips that are capable of being played in the theatre; providing a user interface that allows a first selection of the plurality of media clips to be included in a first show that is to be shown in the theatre; receiving, via the user interface, input that indicates an order in which the first selection of media clips are to be played during the first show; and storing data indicating that the first selection of media clips, when played in the indicated order, forms the first show that is to be shown in the theatre.

In another aspect, some embodiments of the present disclosure provide a computer-readable medium storing instructions which, when executed by a processor, causes the processor to perform a method that facilitates creation a show that is to be shown in a theatre. The instructions may be for: identifying a plurality of media clips that are capable of being played in the theatre; providing a user interface that allows a first selection of the plurality of media clips to be included in a first show that is to be shown in the theatre; receiving, via the user interface, input that indicates an order in which the first selection of media clips are to be played during the first show; and storing data indicating that the first selection of media clips, when played in the indicated order, forms the first show that is to be shown in the theatre.

In another aspect, some embodiments of the present disclosure provide a show control device for facilitating maintenance of a plurality of components that provide effects in a theatre. The show control device can include a processor and a memory storing instructions which, when executed by the processor, cause the processor to: identify a maintenance pattern that indicates a sequence of signals to be transmitted by the show control device; according to the maintenance pattern, send a first signal to activate a first effect in the theatre; delay sending a second signal to activate a second effect in the theatre, wherein the duration of the delay is determined according to the maintenance pattern; and after the delay, send the second signal to activate the second effect in the theatre.

In various embodiments, each signal of the sequence of signals is associated with a respective timecode that indicates when the signal should be transmitted by the show control device. In various embodiments, each timecode is stored in a format corresponding to a period of time that has elapsed after starting execution of the maintenance pattern. In various embodiments, the duration of the delay is determined according to a difference between a timecode for the second signal and a timecode for the first signal.

In various embodiments, at least one of the effects includes a physical effect. The physical effect can include one selected from a group consisting of: a water squirt, an air blast, and a scent release.

In various embodiments, the first effect is provided by a first seat assembly located in one part of the theatre, and the second effect is provided by a second seat assembly located in a different part of the theatre. In variant embodiments, the first effect and the second effect comprise the same physical effect.

In various embodiments, the processor is further configured to: after sending the first signal, send a third signal to deactivate the first effect in the theatre. In various embodiments, the processor is further configured to: after sending the second signal, send a fourth signal to deactivate the second effect in the theatre.

In another aspect, some embodiments of the present disclosure provide a method of performing maintenance on a plurality of components that provide effects in a theatre. The method may include performing the steps of: identifying a maintenance pattern that indicates a sequence of signals to be transmitted by the show control device; according to the maintenance pattern, sending a first signal to activate a first effect in the theatre; delaying sending a second signal to activate a second effect in the theatre, wherein the duration of the delay is determined according to the maintenance pattern; and after the delay, sending the second signal to activate the second effect in the theatre.

In another aspect, some embodiments of the present disclosure provide a computer-readable medium storing instructions which, when executed by a processor, causes the processor to perform a method for facilitating maintenance of a plurality of components that provide effects in a theatre. The instructions may be for: identifying a maintenance pattern that indicates a sequence of signals to be transmitted by the show control device; according to the maintenance pattern, sending a first signal to activate a first effect in the theatre; delaying sending a second signal to activate a second effect in the theatre, wherein the duration of the delay is determined according to the maintenance pattern; and after the delay, sending the second signal to activate the second effect in the theatre.

DRAWINGS

Embodiments of the present invention will now be described in detail with reference to the drawings, in which.

DESCRIPTION OF VARIOUS EMBODIMENTS

Figure 1:
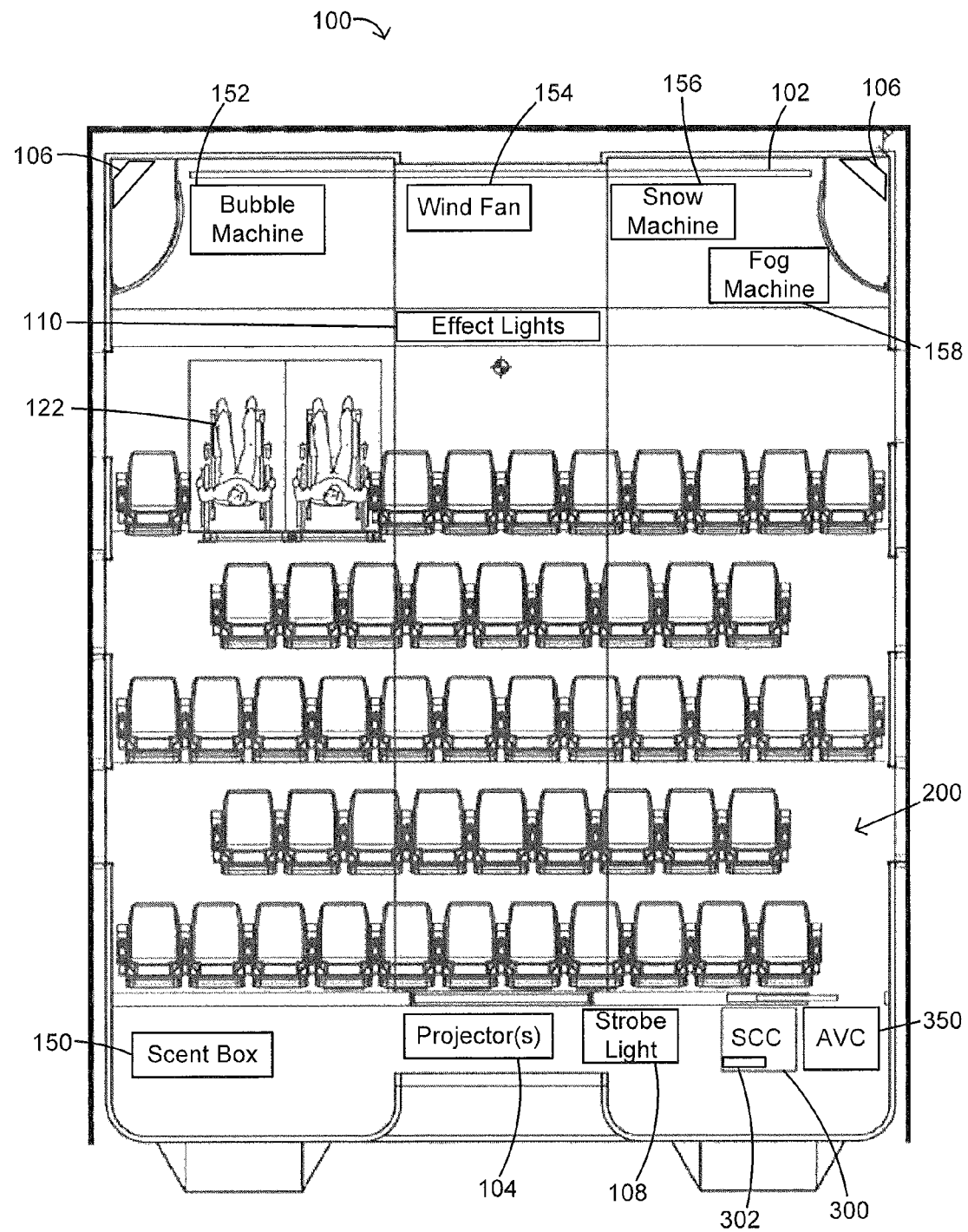
FIG. 1 is a floorplan of a theatre in which the show control device of the present disclosure may be deployed, in accordance with at least one example embodiment.

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor (e.g., a microprocessor), a data storage system (including volatile and non-volatile memory and/or storage elements), at least one input device, and at least one output device. For example and without limitation, the programmable computers may be a personal computer, laptop, personal data assistant, cellular telephone, smartphone device, tablet computer, and/or wireless device. Program code is applied to input data to perform the functions described herein and generate output information. The output information is applied to one or more output devices, in known fashion.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The subject system may also be considered to be implemented as a computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Theatre Providing Effects that are Controllable by a Show Control Device

Referring to FIG. 1, shown there generally as 100 is a floorplan of an example theatre in which the show control device of the present disclosure may be deployed, in accordance with at least one example embodiment. As will be understood, the floorplan is provided for illustrative purposes only, and the show control device of the present disclosure may be implemented in theatres with a variety of different layouts and setups. The term "theatre" as used herein is intended to include any venue capable of playing a show. For example, a theatre need not be fixed to any particular geographic location, and in fact, may be provided in a mobile trailer in various embodiments.

The theatre may contain a number of components for providing effects for audience members 122. These components may include traditional components that provide A/V effects, such as a screen 102, one or more projectors 104, and/or one or more speakers 106. The theatre may also be configured to have components that provide additional lighting effects, such as a strobe light component 108 or an effects lighting component 110. As will be understood, the show control device 302 may be connected to these various components so as to allow the show control device to activate these components in conjunction with the media that is being played at the theatre.

Additionally, the theatre may be set up with various components that provide physical effects to audience members 122. As used herein, the term "physical effect" is intended to mean any effect that may be triggered by 4D media and is in addition to traditional A/V effects of regular cinematic media. These physical effects may be released into the theatre so as to be perceived by all audience members 122 generally, and/or they may be activated in a seat-specific manner.

For the in-theatre physical effects, as illustrated, the theatre may be provided with a scent box 150 for releasing scents, a bubble machine 152 for releasing bubbles, a wind fan 154 for creating a wind sensation, a snow machine 156 for releasing fake snow, and/or a fog machine 158 for releasing fog. These various components may be controlled by the show control device 302 to release their respective physical effects in coordination (e.g., synchronously) with 4D media that is being played in the theatre. For example, the bubble machine may be activated in conjunction with an underwater scene in a 4D film to simulate an underwater experience for audience members 122.

For the seat-specific physical effects, the theatre may be provided with customized seats 200 that are configured to provide the physical effects to the audience members 122. Similar to the in-theatre physical effects, the show control device 302 may be able to activate the seat-specific physical effects in conjunction with 4D media being played in the theatre. Details about the seat-specific physical effects are discussed below with respect to FIGS. 2A and 2B.

When deployed, the show control device 302 may be housed in a show control cabinet 300 (SCC) that contains various additional components that allow the show control device 302 to connect to and control the effects in the theatre (e.g., these components may include a network switch or a lighting controller) or that allow the show control device 302 to receive user input (e.g. a touchscreen assembly). Additionally, as illustrated, the theatre may be provided with an audio/video cabinet 350 (AVC) that may contain an A/V component storing the media that is to be played in the theatre. Further details regarding the interconnections between the components of the show control cabinet 300 and the audio/video cabinet 350 are discussed below with respect to the block diagram illustrated in FIG. 3.

Figure 2A:
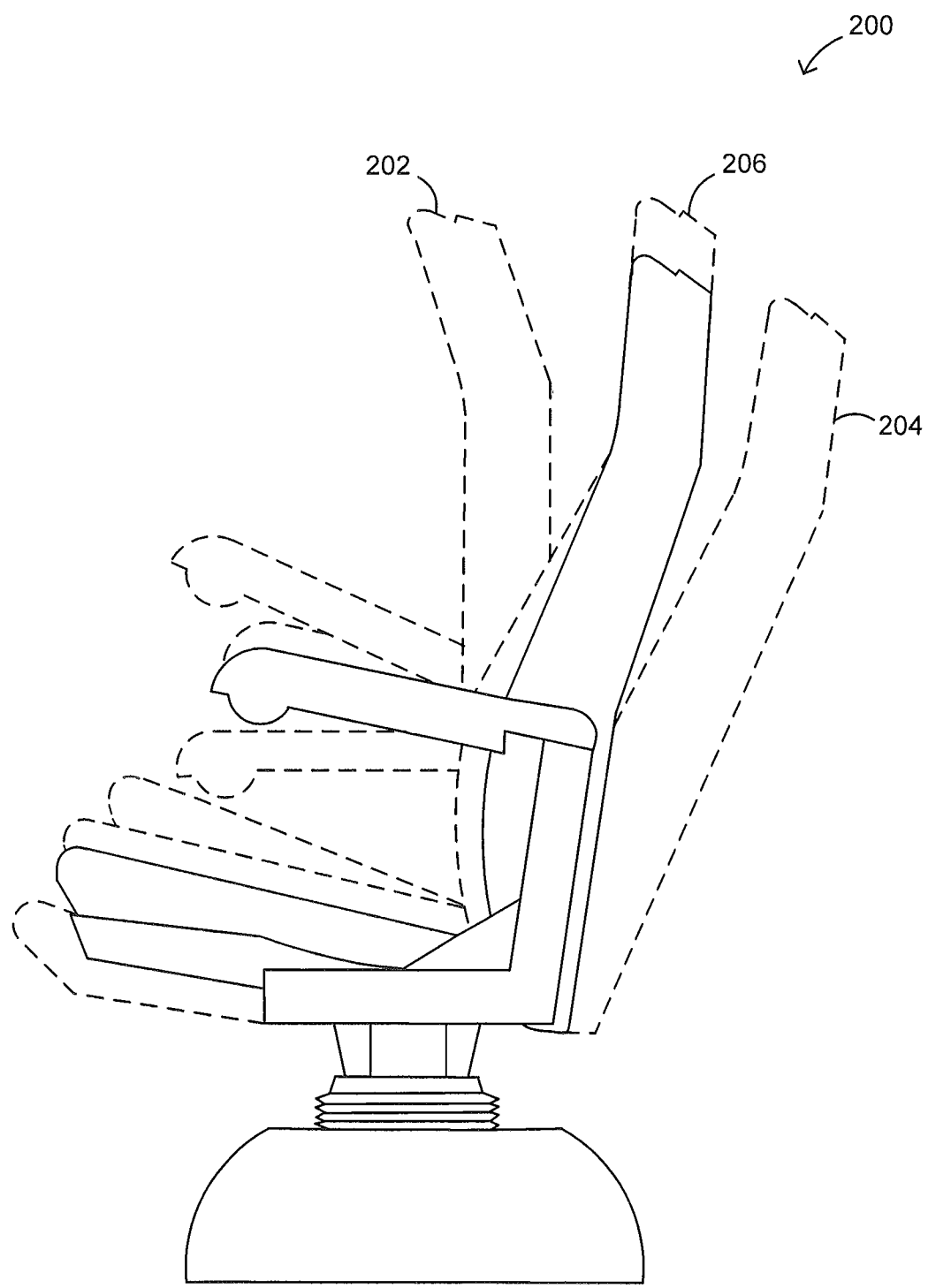
FIGS. 2A and 2B are illustrations of a seat assembly that may be controlled by the show control device of the present disclosure, in accordance with at least one example embodiment.
Figure 2B:
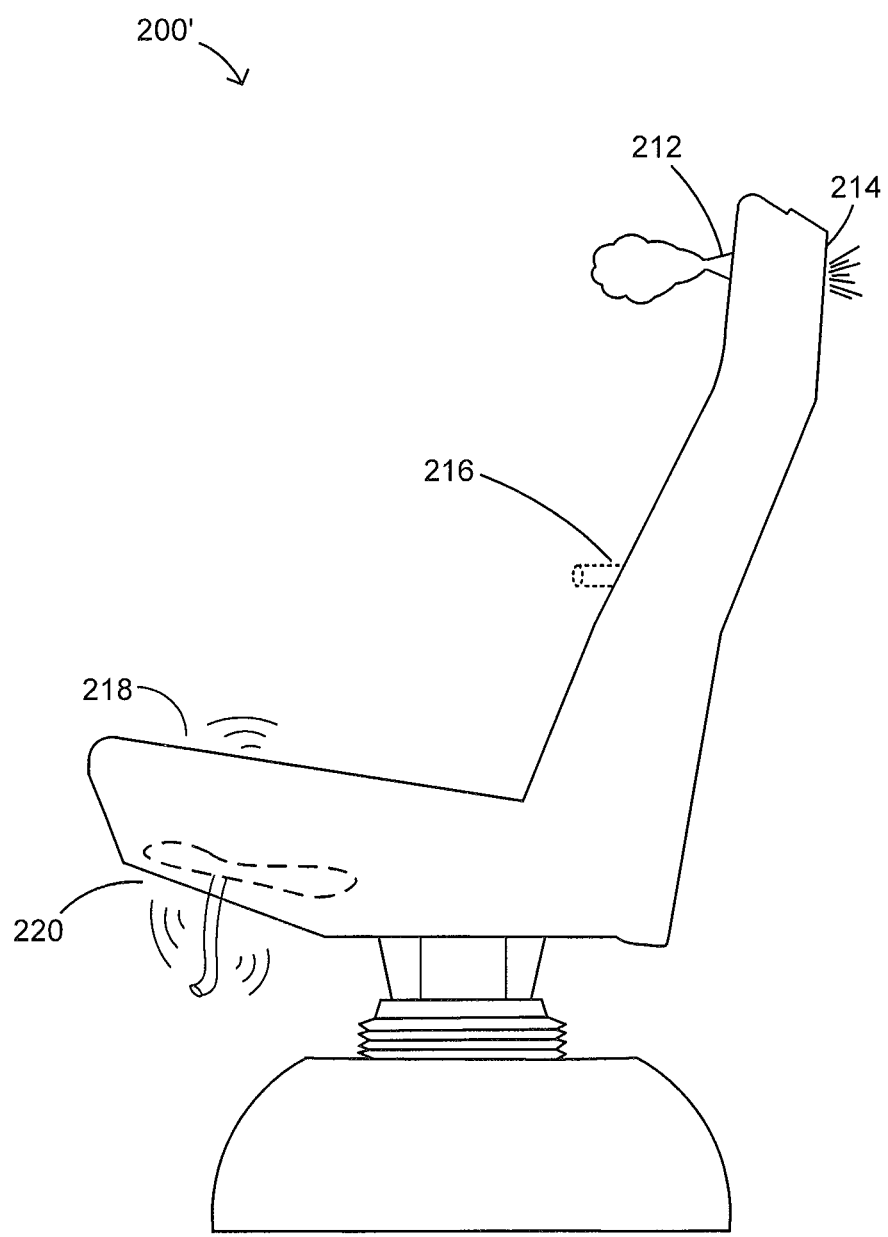

Referring to FIGS. 2A and 2B, shown there generally as 200 and 200' respectively are illustrations of an example seat assembly that may be controlled by the show control device of the present disclosure, in accordance with at least one example embodiment. Referring first to FIG. 2A, shown there is a side profile of the seat assembly in a resting position. The seat may be capable of imparting motion to a subject seated on the seat assembly by, for example, tilting forward or backwards as well as moving up or down. As illustrated, the seat assembly may be moved to be in the forward position 202 (shown in dotted outline) when tilted forward, and in the backward position 204 (shown in dotted outline) when tilted backward. As well, the seat assembly may be configured to be in a raised position 206 (shown in dotted outline) or be lowered to be in the resting position (as shown in regular black line).

The operation of the seat assembly shown in FIG. 2A to impart motion onto a subject seated on the seat assembly is discussed in U.S. Pat. No. 8,287,394, all of which is hereby incorporated by reference.

To place the seat assembly into the various illustrated positions, the seat assembly 200 may be provided with inflatable actuators in the front and rear of the base of the seat assembly. These inflatable actuators may be inflated when a control assembly opens a valve (which is connected to a pressurized source) to force air into the actuator. The inflatable actuators may deflate when an exhaust valve is opened. For example, the opening of an exhaust valve may result in a quick evacuation of all air in the inflatable actuator(s), so as to cause a sensation of a surprise drop for an audience member. The show control device 302 may be configured to send signals to the control assemblies containing these valves so as to control the movement of the seat assembly 200.

Referring now to FIG. 2B, shown there generally as 200' is another illustration of a side profile of a seat assembly, in accordance with at least one example embodiment. FIG. 2B shows seat-specific physical effects that may be provided additionally or alternatively to the motion capabilities of the seat assembly shown in FIG. 2A. As illustrated, the seat assembly 200' may be capable of providing physical effects that stimulate a person seated on the seating assembly. For example, the seat assembly 200' may be configured to provide an air blast 212 near the neck of a seated person to provide a "Neck Tickler" effect, and a water squirt 214 on the rear of the seat back to spray a small quantity of water on the audience member seated behind the seat (e.g., a "Water Squirt" effect). As well, the seat back may contain an extendible member 216 (e.g., an air actuated cylinder) that extends from the seat back into the position shown in the dotted outline. This effect may be considered a "Seat Poke" effect. Further, the seat pan may be provided with an audio transducer coupled to the seat cushion, so as to produce low frequency "Seat Vibration" effects 218. Moreover, a flexible tube may be attached to the underside of the seat pan, such that when the tube is pressurized, it moves sporadically to create a "Leg Tickler" effect 220.

It will be understood that the seat assemblies in FIGS. 2A and 2B are shown for illustration purposes only, and that other types of seat assemblies (that may potentially provide additional or alternative physical effects) can be controlled by the show control device of the present disclosure.

Some of the physical effects discussed above may be generated by a pressurized source. For example, for the "Air Blast" 212, "Seat Poke" 216 or "Leg Tickler" 220 effects provided by the seat assembly shown in FIG. 2B, the pressurized source may contain compressed air that can be released upon the activation of the physical effect. The release of the pressurized air may cause, respectively for each effect, the neck air to be released, the extendible member to extended, and the flexible hose to move sporadically. Similarly, for the "Water Squirt" effect 214, the pressurized source may contain water to spray on an audience member. As a further example, scented air may be stored in a pressurized source, so that when an in-theatre scent effect is desired, the scented air can be released into the theatre.

To release contents of the pressurized source, the pressurized source may be connected to a control assembly which can be configured to release the contents of the pressurized source to generate the physical effect. The control assembly may, for example, be a solenoid valve that is configured to open and close for a predetermined duration upon receiving signals from the show control device 302.

4D media may be provided in the form of a script file that indicates when physical effects are to be activated synchronously with the regular cinematic video. Additionally or alternatively, the 4D media itself may contain information that indicates that a physical effect is to be activated at a certain time during the playing of the 4D media in the theatre. In either case, neither the separate script file nor the 4D media itself may contain the information necessary to directly cause the physical effect to occur. For example, the script may only indicate that a physical effect is to be activated, without indicating the particular electrical signals that are needed to cause the opening of the valves to release the contents of the pressurized source.

As such, the show control device 302 may need to translate the data from the script into signals for the control assembly, so that the control assembly can release the pressurized source in a manner that provides the desired physical effect. Specifically, the show control device 302 may be adapted to release the contents of the pressurized source for a predetermined period of time that is selected according to the physical effect.

For example, for a "seat poke" effect, the show control device 302 may send a signal to a control assembly to release pressurized air for a short period of time (e.g., 7-8 frames, roughly equal to 230-260 milliseconds) so that the extendible member can quickly extend and retract to simulate a poking action. Similarly, for a "water squirt" effect, the show control device may send a signal to a control assembly to released pressurized water for a short period of time (e.g., 5-6 frames, roughly equal to 170-200 milliseconds) so that only a small amount of water is sprayed onto an audience member. In a further example, for a scent effect, the show control device may send a signal to a control assembly to open a valve in the scent box 150 for a long period of time (e.g., 6-10 seconds) so that the scent has time to fill the entirety of the theatre.

Figure 3:
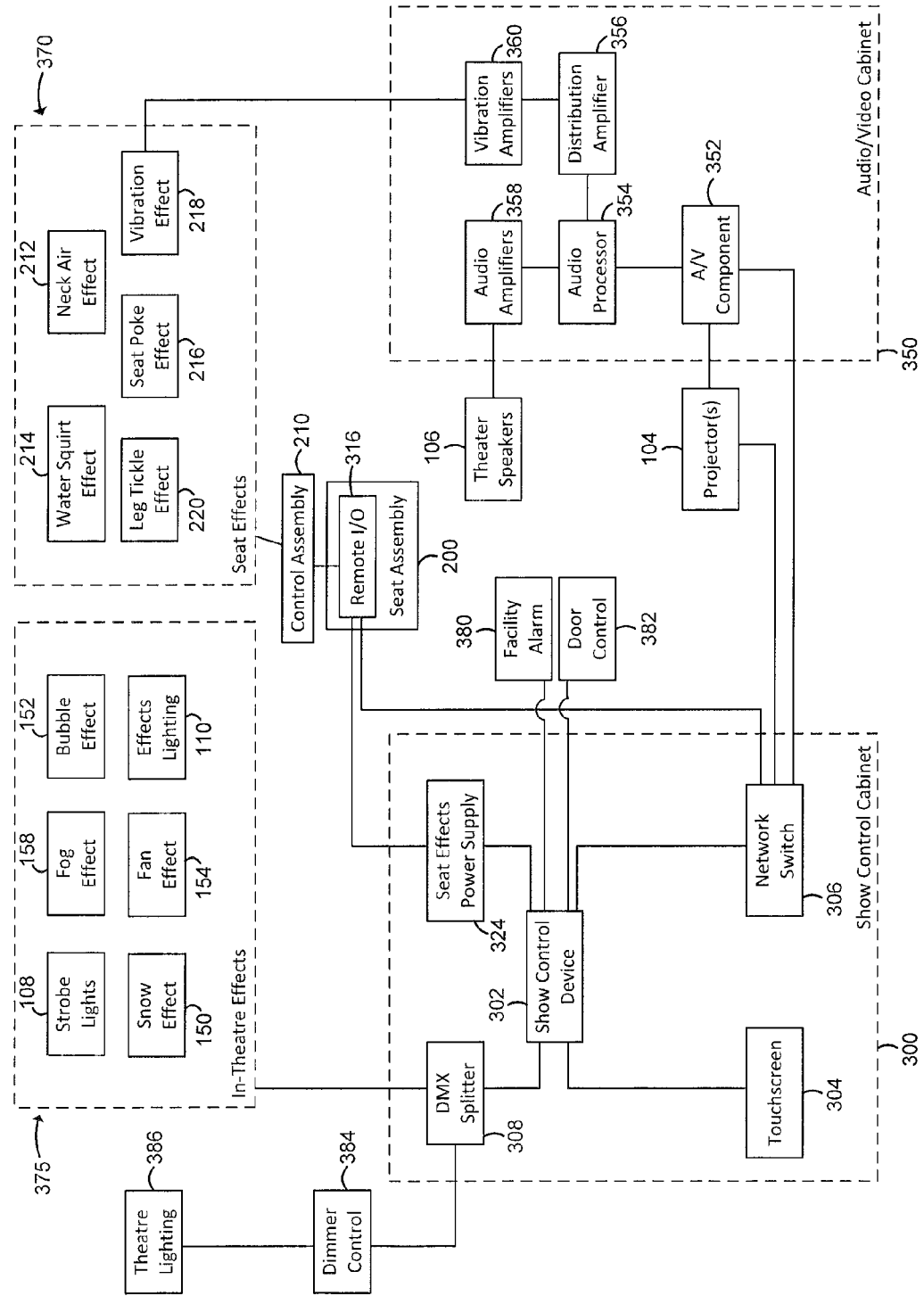
FIG. 3 is a block diagram of a system for controlling effects in a theatre, in accordance with at least one example embodiment.

Referring to FIG. 3, shown there is a block diagram of a system for controlling effects in a theatre, in accordance with at least one example embodiment. FIG. 3 illustrates how the different components provided in a theatre (as discussed above with respect to FIG. 1) can be interconnected. Specifically, it illustrates the interconnections amongst the components of the show control cabinet 300, the components of the audio/video cabinet 350, the seat effects 370, the in-theatre effects 375, and some traditional theatre features such as the facility alarm 380, theatre doors 382, and/or theatre lighting 386.

The show control cabinet 300 houses various components that facilitate the control of effects by the show control device 302. The show control device may be any suitable computing device capable of executing instructions (e.g., software code) for performing the actions described as being performed by the show control device 302 herein. In one example, the show control device 302 may be implemented using a standard rack-mounted server computer. In another example, the show control device 302 may be implemented using a dedicated show controller device (e.g., such as may be manufactured by Alcorn McBride Inc.).

The show control device 302 may be connected to a touchscreen assembly 304 so that the show control device 302 may display information and receive user input. The show control device 302 may also be connected to various other components housed within the show control cabinet 300, to provide control of various effects in the theatre. These other components will be described below with respect to the external components and/or effects they control.

A network switch 306 (e.g., a switch manufactured by N-TRON Corp.) can be provided to relay communications to and/or from the show control device 302 and various external components. For example, the network switch 306 may connect the show control device 302 with the projector(s) 104 (e.g., as illustrated in FIG. 1), as well as an audio/video (A/V) component 352 such as a video server (e.g., a QuVIS Cinema Player™ manufactured by QuVIS, Inc.). Examples of signals that can be sent from the show control device 302 to the projector(s) 104 include whether to open or close the shutters. Examples of signals that can be sent from the show control device 302 to the A/V component 352 include a start signal that instructs the A/V component 352 to start playing a particular media clip or show.

Although the A/V component 352 is illustrated in FIG. 3 as being one component, it will be understood, that the A/V component 352 may include one or more components that are generally capable of providing an audio and/or video signal. For example, additional or alternative to the video server, the show control device 302 may also be connected to other media players (e.g., media players that are capable of reading data off optical discs such as a Blu-Ray™ disc player).

The sending of a start signal to the A/V component 352 may result in signals being sent to other components housed in the audio/video cabinet 350. For example, once a media clip is started on the A/V component 352, the A/V component 352 may send audio signals to the audio processor 354 (e.g., a digital and analog cinema sound processor manufactured by USL Inc.), which may in turn send those audio signals to audio amplifier 358 so that sound effects may be played over the theatre speakers 106 (e.g., as illustrated in FIG. 1). The audio processor 354 may also send signals to a distribution amplifier 356, which may in turn relay that signal to a vibration amplifier 360 that amplifies lower-frequency signals and sends them to the audio transducers in the seat pan of the seats 200, so as to cause the vibration effects 218 discussed above with respect to FIG. 2B.

As well, the A/V component 352 may be connected to the projector(s) 104 so that the video portions of the media can be projected on the screen in the theatre. As will be understood, the video portions of the media may be provided in two-dimensions (2D) or three dimensions (3D), and the number and/or type of the projector(s) may be selected accordingly so as to allow such media to be shown.

The A/V component 352 may be capable of processing A/V media that is associated with data (e.g., a separate script file) that indicates when various physical effects should be activated in synchronization with the A/V media. In operation, when the script file indicates that a particular physical effect is to be activated, the NV component 352 may send a message back to the show control device 302 (e.g., via network switch 306) so that the show control device 302 can activate the physical effect indicated by the script file.

When the show control device 302 receives the data from the A/V component 352 indicating that a particular seat effect is to be activated, the show control device 302 may translate the data into one or more signals that are capable of causing the physical effect to be activated. The one or more signals may then be sent to a control assembly 210, which activates the appropriate physical effect in response. As discussed above with respect to FIGS. 2A and 2B, the control assembly 210 may, in some embodiments, be a solenoid valve. In such case, the signals transmitted by the show control device 302 to the control assembly 210 may be electrical signals that cause the solenoid valve to release a pressurized source (e.g., air or water) for a predetermined duration that is appropriate for the physical effect to be activated.

Referring back to the show control cabinet 300, the show control device 302 may be connected to additional components that facilitate the communication between the show control device 302 and the control assembly 210. When the show control device 302 activates seat effects, for example, instead of sending a signal directly to the control assembly 210, the show control device 302 may be configured to send the signal through the network switch 306 to the remote input/output (I/O) module 316 in the seat assembly 200, which may then route the signal to the control assembly 210. As illustrated, the show control device 302 may also be connected to a seat effects power supply 324 that may provide power to the remote I/O module 316, with the remote I/O module 316 in turn routing power to the control assembly 210 when producing a physical effect. The seat effects power supply 324 may, for example, provide power to a compressor that ensures that the pressurized source that generates the physical effects maintain a minimum level of pressure.

It will be understood that FIG. 3 shows an example layout for the positioning of the remote I/O module 316 and the seat effects power supply 324, and that other ways of connecting and positioning the components may be possible. For example, the remote I/O module 316 may not be placed in the seat assembly 200 itself, but instead may be placed apart from the seat (e.g., in a physical location that is in close proximity to the seat assembly 200). Additionally or alternatively, instead of each seat assembly 200 being associated with its own remote I/O module 316, a single remote I/O module 316 may connect to multiple seat assemblies 200 (e.g., a row of seats). Further, in various embodiments, the seat effects power supply 324 may be positioned closer the seat assembly 200 instead of being placed in the show control cabinet 300.

As illustrated in FIG. 3, only the non-motion seat effects ("Neck Air Effect" 212, "Water Squirt Effect" 214, "Seat Poke Effect" 216, "Vibration Effect" 218, and "Leg Tickle Effect" 220) are shown as being grouped with in the dotted outline 370. However, it will be understood that the show control device 302 may also be able to control the motion seat effects discussed above with respect to FIG. 2A. As will be understood, when referring to the physical effects that are similar to that which is described in FIGS. 2A and 2B, similar reference numerals are used.

In addition to the seat-related physical effects, the show control device 302 may also control the in-theatre effects 375. As illustrated, these effects (the strobe light effect 108, the fog effect 158, the bubble effect 152, the snow effect 156, the fan effect 154, and the effects lighting 110) are grouped together in a dotted outline 375. To control these in-theatre effects, the show control device 302 may be connected to the various machines/lights that produce these effects (e.g., the strobe light for the strobe light effect 108 or the bubble machine for the bubble effect 152). In some embodiments, this connection may be implemented using the "DMX" standard, which is also known as "DMX512". As will be understood, DMX is a commonly used digital communication network that allows the show control device 302 to send signals to the various machines or lights that produce these effects. As there may be a number of different in-theatre effects 375, the show control cabinet 300 may be provided with a DMX splitter 308 to allow the show control device 302 to communicate with each of the machines/lights. Although no separate control assemblies are illustrated for the in-theatre effects 375, it will be understood that switches for turning on and turning off the machines and/or lighting that cause the various in-theatre effects may constitute a "control assembly" in the context of the present embodiments.

Furthermore, the show control device 302 may be configured to control various traditional theatre features. For example, by controlling the dimmer control 384, the show control device 302 may be able to increase or decrease the theatre lighting 386. As illustrated, the show control device 302 may be connected to the dimmer control 384 using a DMX connection, such that the connection may first be passed through the DMX splitter 308. It will be understood that the show control device 302 being capable of using DMX dimming capabilities is only an illustrative example, and that the show control device 302 may be capable of communicate using other technologies to achieve a dimming effect. For example, the show control device 302 may additionally or alternatively be capable of supporting discrete controlled dimmers as well.

Other traditional theatre features that may communicate with the show control device 302 include the theatre facility alarm 380 and/or the theatre doors 382. For example, the show control device 302 may receive input from the facility alarm so that if there is an active alarm, the show control device 302 may provide a visual indication of the active alarm on the touchscreen 304. As well, the show control device 302 may control the theatre doors to open and close the theatre entrance and exit doors in synchronization with the media that is being played.

It will be understood that the organization of the various components shown in FIG. 3 is for illustrative purposes only, and that other ways of organizing these components may be possible. For example, one or more of the components illustrated as being housed in the A/V cabinet 350 may be housed in the show control cabinet 300. As well, although an example embodiment that contains numerous components is illustrated in FIG. 3, it will be understood that not all of the illustrated components are required to be present in a deployment of the show control device 302. For example, one or more of the components shown in FIG. 3 may be omitted in a given deployment.

Show Creation Mode

In addition to controlling the activation of the effects in a theatre during the playing of a show in the theatre, the show control device 302 may be configured to operate in a show creation mode that allows theatre personnel to customize and save shows by "mixing and matching" different media clips. This may desirable, for example, to modify the length of the show so as to adjust for how busy a theatre is during a given period. For example, theatre personnel may be able to customize a show by removing some optional media clips so as to create a shorter show, so that more people may visit the theatre during peak season.

Figure 4:
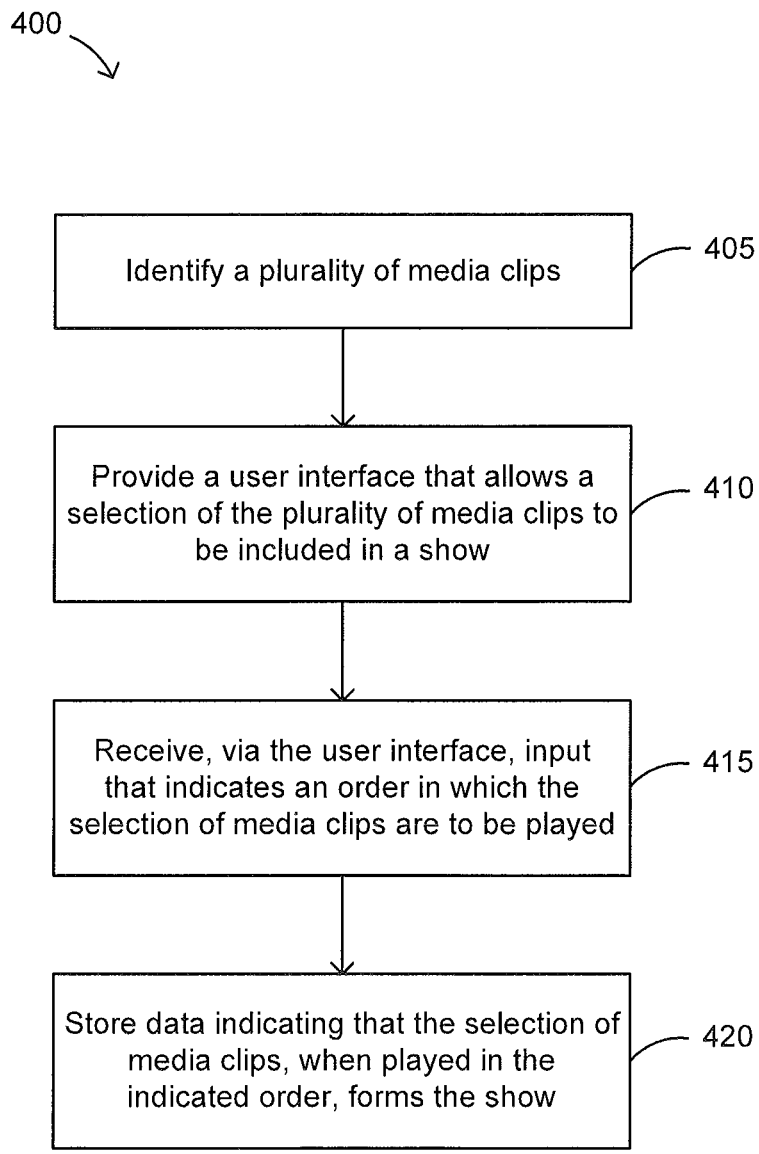
FIG. 4 is a flowchart diagram showing the steps of a method for facilitating creation of a show, in accordance with at least one example embodiment.

Referring to FIG. 4, shown there generally as 400 is a flowchart diagram showing the steps of a method for facilitating creation of a show, in accordance with at least one example embodiment. The method may, for example, be performed by the show control device of the present disclosure. When discussing the various steps of FIG. 4, reference will also simultaneously be made to the user interface shown in FIG. 5, as well as various components shown in FIG. 3. When discussing the method of FIG. 4, an example scenario where the theatre is playing a show called "Dinosaur Tour" will be discussed.

At step 405, a plurality of media clips that are capable of being played in the theatre may be identified. For example, the show control device 302 may be able identify a number of different media clips by querying the A/V component 352 for clips that are capable of being played in the theatre. In various embodiments, the A/V component 352 may store these clips so as to make them available to the show control device 302 for this purpose. For the "Dinosaur Tour" example show, the A/V component 352 may store a number of media clips related to dinosaurs. The show control device 302 may then be able to query the A/V component 352 to identify these clips.

At step 410, the show control device 302 may provide a user interface that allows a selection of the plurality of media clips to be included in a show that is to be shown in the theatre. These media clips may be of the A/V media type discussed above that contains data indicating when a physical effect provided in a theatre should be activated. As noted, some of these physical effects may include: a water squirt, an air blast, and/or a scent release.

Figure 5:
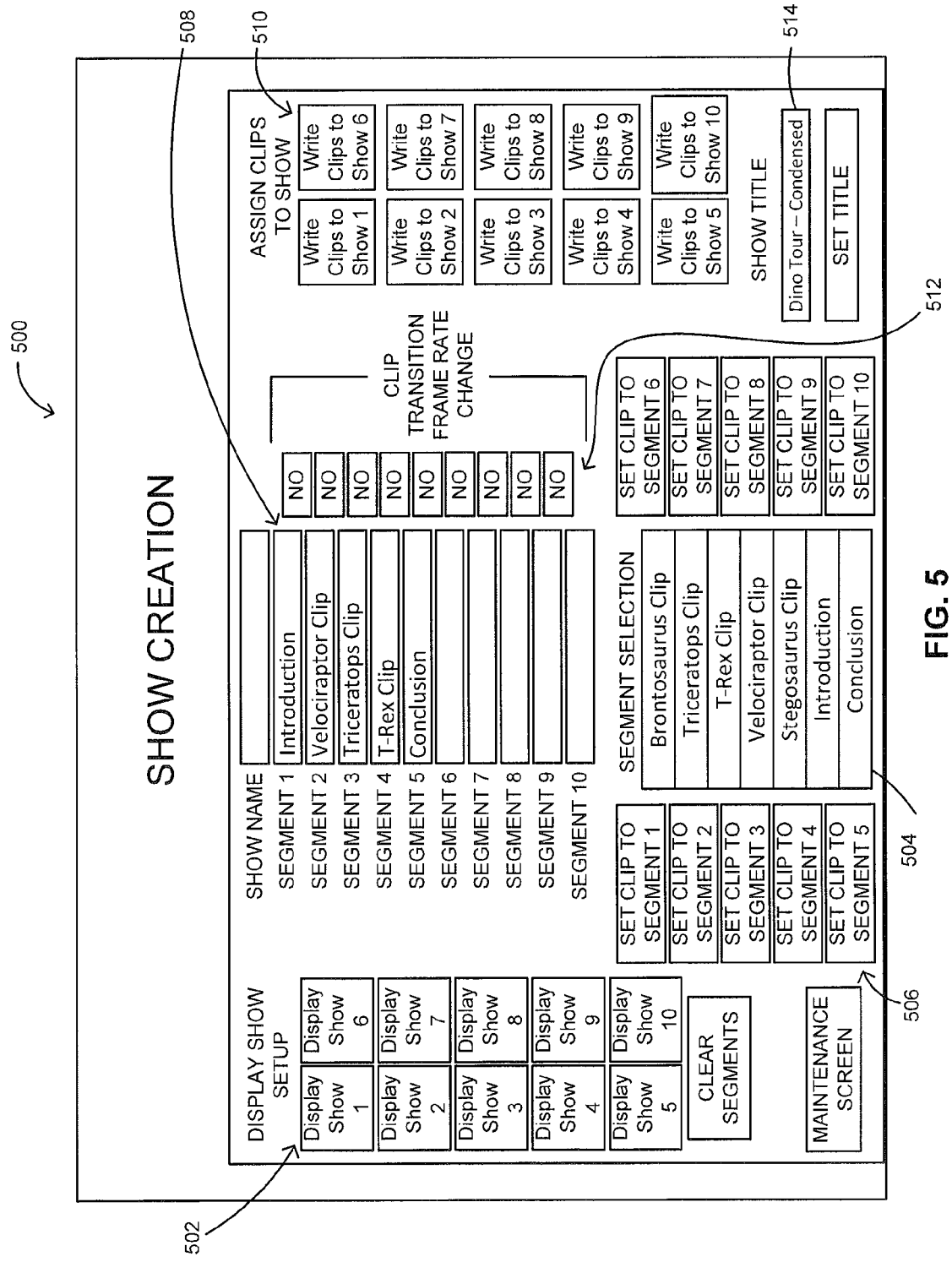
FIG. 5 is a screenshot of an example user interface that allows for creation of a show, in accordance with at least on example embodiment.

Referring now to FIG. 5, shown there generally as 500, is a screenshot of an example user interface that allows for creation of a show, in accordance with at least on example embodiment. The screenshot may be displayed, for example, on the touchscreen 304 (as shown in FIG. 3) that the show control device 302 is connected to. In various embodiments, a portion of the user interface 500 may display the media clips identified at step 405 as being capable of being played, so that they can be selected for inclusion into the show to be created. As illustrated, a list control 504 labeled "Segment Selection" is provided for this purpose. In the example user interface of FIG. 5, the term "segment" is used generally to refer to the media clips that can be selected. It will be understood that the terms "segment", "media clip", and "clip" may be used interchangeably in the present disclosure.

Continuing on with the example scenario for creating a show called "Dinosaur Tour", the list control 504 may display a list of media clips that are eligible for inclusion in the "Dinosaur Tour" show. As illustrated, the list control may include media clips named "Introduction" and "Conclusion", as well as clips that describe individual dinosaurs ("Brontosaurus Clip", "Triceratops Clip", "T-Rex Clip", "Velociraptor Clip", and "Stegosaurus Clip").

The user interface 500 contains clip inclusion controls 506 (e.g., buttons) that allows the show control device 302 to receive input indicating that a given selected media clip in the list control 504 is desired to be included in the show that is to be created. In operation, the show control device 302 may receive input highlighting one of the available media clips in the list control 504. Once highlighted, the show control device 302 may then receive further input activating one of or more of the clip inclusion controls 506, so that the highlighted media clip is added to the show being created.

Returning to FIG. 4, at step 415, the show control device 302 may receive, via the user interface, input that indicates an order in which the selection of media clips are to be played during the show. In the example user interface illustrated in FIG. 5, the user input to select the order in which a given media clip is to be played is coupled with the user input that selects a clip for inclusion into the show. That is, in the example user interface, a fixed number of media clip slots 508 (e.g., ten) can be filled when creating a show. An individual clip inclusion control 506 can then be provided for each of the ten media clip slots. When, for example, a media clip is selected in the list control 504, the user may select any of the available clip inclusion controls 506 (e.g., the "set clip to segment 1" button) to place it into the slot indicated on the control (e.g., "segment 1"). In this manner, the input regarding the order in which the media clips are to be played may be received at the same time as the input for indicating that a particular media clip is to be included in a show.

In various embodiments, the input regarding the selection of a media clip for inclusion into a show, and the input regarding the order in which the selected media clips are to be played may be received in different ways. For example, the user interface may provide a single clip inclusion control 506 that allows the show control device 302 to receive input indicating that a highlighted media clip is to be included in the show, and a separate re-ordering control may be provided to allow the show control device 302 to receive input about the order in which the selected media clips are to be played.

In the example scenario of creating a show called "Dinosaur Tour", the theatre owner may be attempting to create a condensed version of the "Dinosaur Tour" show. The show control device 302 may thus receive input to select a subset of the available media clips for inclusion into the created show. Specifically, the show control device 302 may have received input selecting the "Introduction" clip to be in the "segment 1" slot, the "Velociraptor Clip" to be in the "segment 2" slot, the "Triceratops Clip" to be in the "segment 3" slot, the "T-Rex Clip" to be in the "segment 4" slot, and the "Conclusion" clip to be in the "segment 5" slot. Notably, the "Brontosaurus Clip" and "Stegosaurus Clip" may be excluded from this show so as to reduce the running time of the show.

In various embodiments, the user interface 500 may be configured to provide a plurality of clip transition controls 512 that allow the show control device 302 to receive input indicating that there is a difference between the frame rates for any two media clips that are to be played consecutively during the first show. As illustrated, these clip transition controls may toggle between 'NO' and 'YES' to indicate whether there is a difference between the frame rates of the media clips beside which the button is placed (e.g., the top clip transition control would indicate whether there is a difference between the media clip selected for "segment 1" and the media clip selected for "segment 2"). If the show control device 302 receives input indicating that there is a difference between the frame rates of two consecutive media clips being shown, the show control device 302 may be configured to send a signal to the projector(s) 104 to close the shutter when transitioning between the two clips. Closing the shutters may prevent visual inconsistencies from being shown onscreen.

Referring again to FIG. 4, at step 420, the show control device 302 may store data indicating that the selection of media clips, when played in the indicated order, forms the show that is to be shown in the theatre. For example, the data corresponding to the various contents of the user interface 500 may be stored as a created show. In the example user interface 500 shown in FIG. 5, the particular media clips and their playing sequence indicated in the media clip slots 508 (as well, as potentially any other information that may be received via the user interface 500) may be stored as a show using the show storage controls 510.

As illustrated, the show control device 302 may provide the ability to store a fixed number of shows (e.g., ten). The show storage controls 510 (e.g., buttons) may then be provided to allow the show control device 302 to receive input storing the selected sequence of media clips as a show in any one of the ten show spots. For example, a selection of the "Write Clips to Show 4" button would save the selected sequence of media clips in the "show 4" spot.

As will be understood, the different show spots may store different selections and/or orderings of media clips for different shows. Since there may be many show spots, it is possible that the same clip may be in multiple shows. For example, in the "Dinosaur Tour" scenario, the "T-Rex" clip may be popular and may be included in both the long and condensed versions of the "Dinosaur Tour" show. Alternatively, the theatre owner may desire to create two distinct shows containing non-overlapping content from media clips available to him. Considering the "Dinosaur Tour" scenario again, one show may play the "Brontosaurus" and "Stegosaurus" clips, while the other show may play the "Velociraptor", "Triceratops", and "T-Rex" clips. Many additional ways of selecting clips for inclusion in the show may be possible.

The user interface 500 in FIG. 5 also provides various show load controls 502 that allow data which were previously stored in the show spots to be retrieved and edited. For example, a show that was saved in the "show 4" spot could later be retrieved by selecting the "display show 4" control. The show control device 302 may then be able to populate the media clips slots 508 with the stored data, so as to allow modification of the media clips included in the show, and/or the ordering of the media clips in the show.

Additionally, the user interface 500 shown in FIG. 5 may contain control(s) that allow a show to be named prior to the show being saved. For example, continuing on with the "Dinosaur Tour" show example, a title of "DinoTour—Condensed" may be entered into the text field in 514 prior to the show being saved using the show storage controls 510.

Once saved, the show control device 302 may further be able to provide a user interface that allows of the different saved shows to be selected for playing in the theatre. While not illustrated, this user interface may, for example, provide a listing of the ten show spots, and allow any one of the ten shows to be selected to be played in the theatre.

Figure 6:
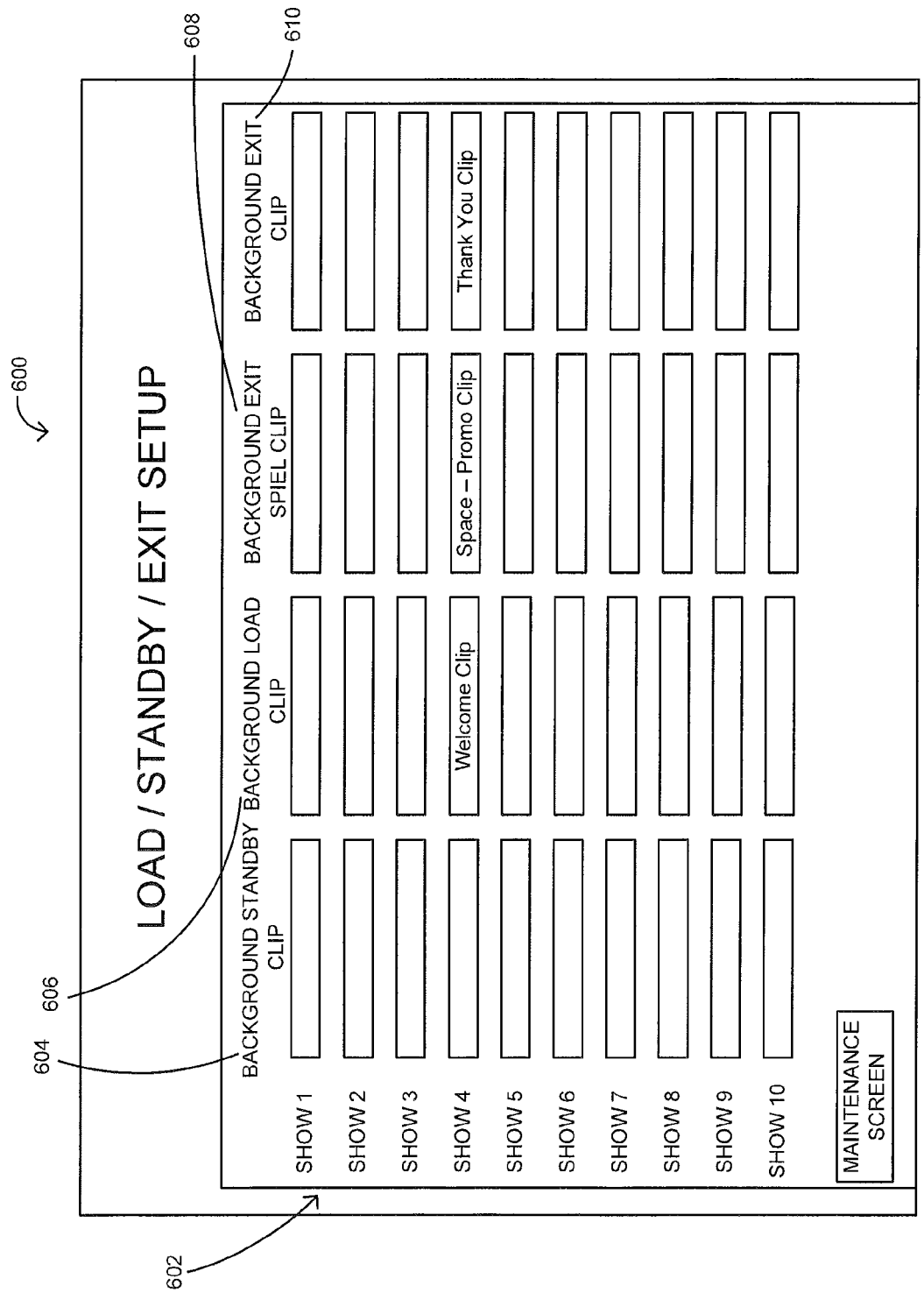
FIG. 6 is a screenshot of an example user interface that allows selection of media clip(s) to be played during the loading, exiting or standby periods of a show, in accordance with at least one example embodiment.

Referring to FIG. 6, shown there generally as 600 is a screenshot of an example user interface that allows selection of media clip(s) to be played during loading, exiting or standby of a show, in accordance with at least one example embodiment. For example, in addition to when a show is actually being played in the theatre, there may be other times when there are audience members in the theatre. The show control device 302 may provide a user interface that also allows theatre personnel to configure what is being shown in the theatre during these other periods.

As illustrated, the user interface 600 may allow various clips to be selected to be played during each of the indicated periods for the ten show slots 602 that can be created in the user interface of FIG. 5. Specifically, a "background standby clip" 604, a "background load clip" 606, a "background exit spiel clip" 608 and a "background exit clip" 610 can be selected for each of "show 1" to "show 10".

Figure 7:
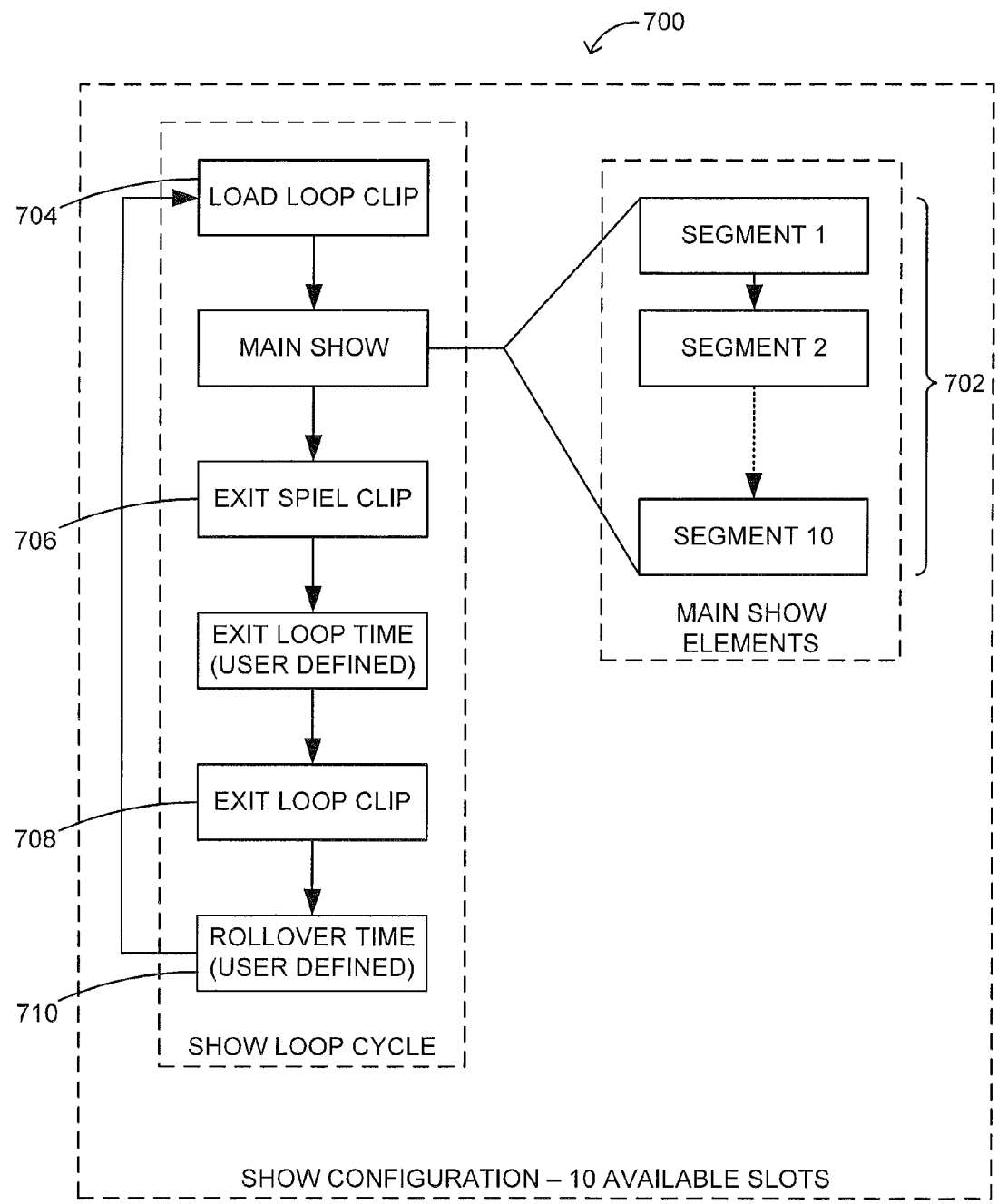
FIG. 7 is a flowchart diagram showing the sequence of clips that are played when a created show is played at a theatre, in accordance with at least one example embodiment.

To illustrate when these various periods may arise during the playing of a given created show, reference is now briefly made to FIG. 7. FIG. 7 shows generally as 700, a flowchart diagram for the sequence of clips that are played by the show control device 302 when a created show is played at a theatre, in accordance with at least one example embodiment.

Before the created show (the "main show" in FIG. 7) is played, a "load" loop clip 704 may be repeatedly played. For example, the "load" clip may show a series of upcoming film releases or advertisements for the concession. The load clip may be played while the audience members are filling the theatre and getting to their seat. The main created show may then be started. This may lead to the playing of the various media clips 702 identified as being for the included in the created show.

After the main show is completed, an "exit spiel" clip 706 may be played. An exit spiel clip may be a concluding clip that the theatre plays to convey a specific message to audience members. For example, the exit spiel clip may be a message to remind audience members to visit the gift shop or a reminder about an upcoming film release. The exit spiel clip may typically be played once.

After the playing of the exit spiel clip 706, an "exit" loop clip 708 may be repeatedly played for a period of time (e.g., the "exit loop time" shown in FIG. 7). The exit loop time may be user-definable, for example, via a user interface provided by the show control device 302. The exit loop clip may be a clip that runs in the background while members of the audience are exiting. For example, it may be a clip that thanks the audience member for attending the theatre.

After the exit loop time has elapsed, there may be a period of time before the load clip is started again (e.g., the "rollover time" illustrated in FIG. 7). The rollover time may be user-definable, for example, via a user interface provided by the show control device 302. While not illustrated in FIG. 7, the period during the rollover time may also be considered the "standby" period for which a clip is selectable in the user interface shown in FIG. 6.

Referring back to FIG. 6, in operation, when any one of the standby, load, exit spiel, or exit periods for a given show is selected, the show control device 302 may identify the media clips that can be played during the respective period of the show. The show control device 302 may then provide an additional user interface (e.g., a popup dialog or window) that allows selection of one or more of the additional media clips for playing during the respective period of the show. For example, the popup dialog may contain a list control that is similar to the list control 504 shown in FIG. 5, except that the media clips available for selection may be media clips that are suitable for playing during a loading, exit spiel, exit and/or standby period instead of media clips suitable for inclusion in a show.

Continuing on with the example of creating a "Dinosaur Tour", the "DinoTour—Condensed" show may have been saved in the "show 4" slot. As illustrated in FIG. 6, theatre personnel may have additionally selected to play a "welcome" clip during the load period, a "space—promo clip" promotional clip for an upcoming film release during the exit spiel period, and a "thank you" clip during the "exit" period. The theatre personnel may have selected not to play any clip at all during the "standby" period (e.g., because the theatre may not contain any audience members during this time).

Theatre Maintenance Mode

A theatre that is able to provide physical effects may have additional components that could break down. In various embodiments, the show control device 302 may be configured to provide functionality that allows theatre personnel to perform maintenance on the additional components.

Figure 8:
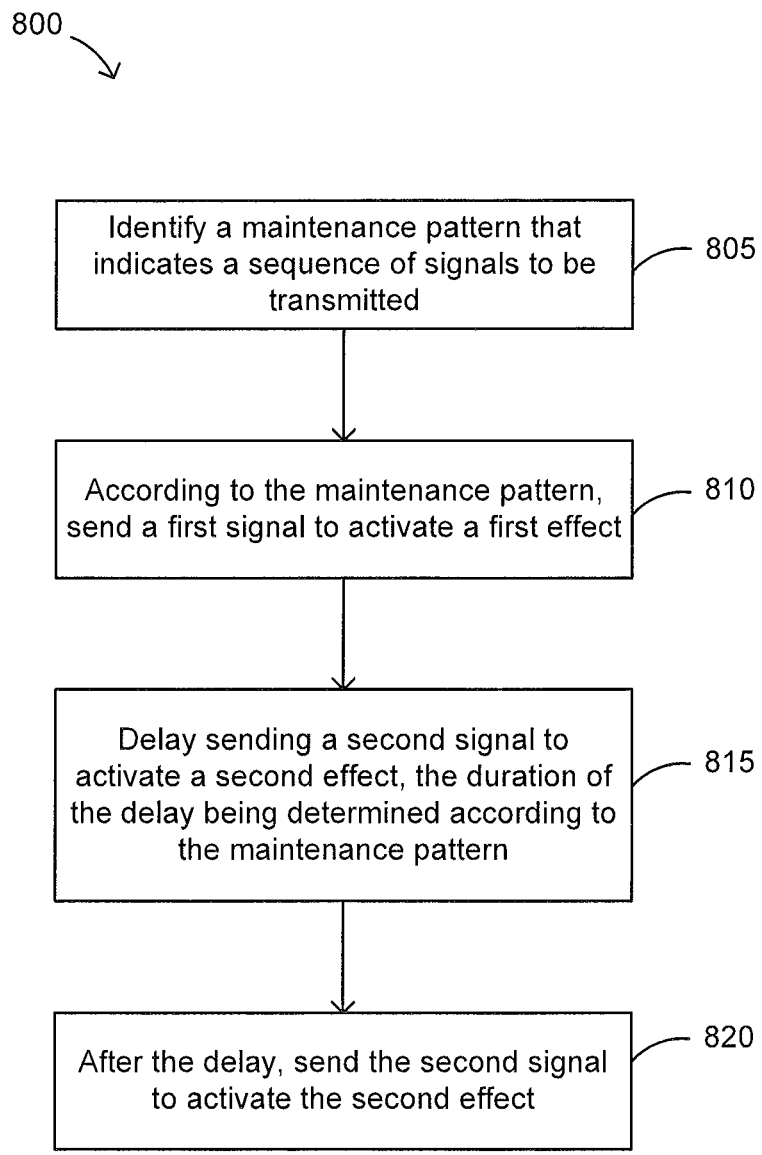
FIG. 8 is a flowchart diagram showing the steps of a method for facilitating maintenance of a plurality of components that provide effects in a theatre, in accordance with at least on example embodiment.

Referring to FIG. 8, shown there generally as 800 is a flowchart diagram showing the steps of a method for facilitating maintenance of a plurality of components that provide effects in a theatre, in accordance with at least one example embodiment. The method may, for example, be performed by the show control device of the present disclosure. When discussing the various steps of FIG. 8, reference will simultaneously be made to the maintenance pattern illustrated of FIG. 9, as well as various components shown in FIG. 3.

At 805, the show control device 302 may identify a maintenance pattern that indicates a sequence of signals to be transmitted by the show control device.

Figure 9:
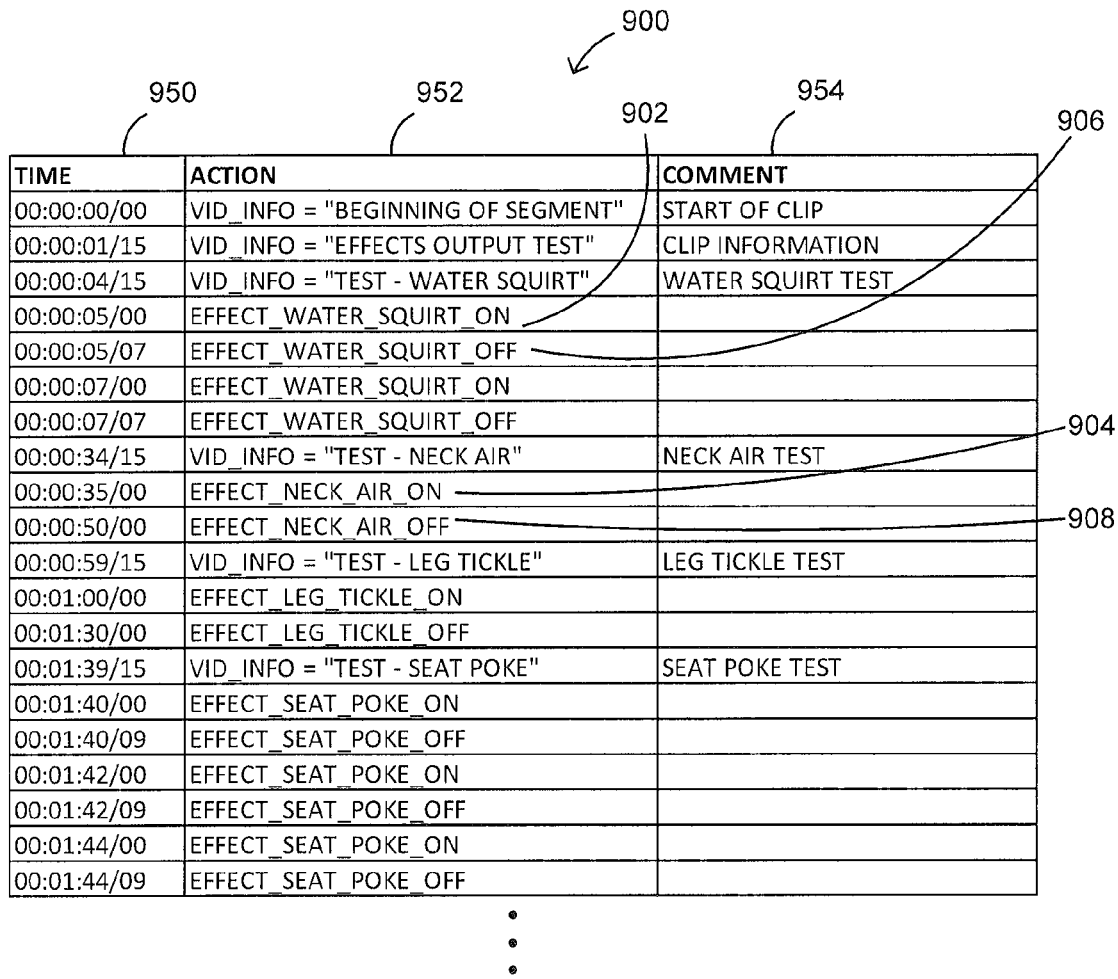
FIG. 9 is an excerpt of an example maintenance pattern that may be executed by the show control device of the present disclosure, in accordance with at least one example embodiment.

Referring briefly to FIG. 9, shown there generally as 900 is an excerpt of an example maintenance pattern that may be executed by the show control device of the present disclosure, in accordance with at least one example embodiment. As illustrated, the maintenance pattern may be provided in a format corresponding to a period of time that has elapsed after starting execution of the maintenance pattern. For example, the timecode 950 illustrates that at the indicated time, the action indicated in the "action" column 952 is to be performed. Additionally, the maintenance pattern may be provided with a "comment" column 954 that allows the individual creating the maintenance pattern to enter a comment regarding the action that is being performed.

In various embodiments, the maintenance pattern may specify the device that is to perform the specific action. For example, the maintenance pattern may indicate that other components connected to the show control device 302 may also perform an indicated action.

It will be understood that format of the maintenance pattern shown in FIG. 9 is an example only, and that other formats for providing maintenance pattern may be possible.

Referring back to FIG. 8, at 810, the show control device 302 may, according to the maintenance pattern, send a first signal to activate a first effect in the theatre. For example, referring again to the maintenance pattern of FIG. 9, one example signal may include sending an "EFFECT_WATER_SQUIRT_ON" signal 902 to a seat assembly 200 (e.g., as illustrated in FIGS. 2 and 3) as part of a "Water Squirt Test".

At 815, the show control device 302 may delay sending a second signal to activate a second effect in the theatre. The duration of the delay may be determined according to the maintenance pattern. For example, the maintenance pattern shown in FIG. 9 may show that the next effect to be tested after the water squirt test is the neck air test. This second test may begin with the sending of the second signal 904 entitled "EFFECT_NECK_AIR_ON". However, because the maintenance pattern indicates that the first signal 902 to turn on the water squirt is to be sent at "00:00:05", and the second signal to turn on the neck air is to be sent at "00:00:35", there will be a delay of "00:00:30" between the sending of the first and the second signals. In this manner, the duration of the delay between the sending of two signals in the maintenance pattern may be determined by a difference between a timecode for the second signal and a timecode for the first signal.

At 820, after the delay, the show control device 302 may then send the second signal to activate the second effect in the theatre. In the maintenance pattern illustrated in FIG. 9, the "EFFECT_NECK_AIR_ON" signal 904 can be sent at the "00:00:35" mark.

In various embodiments, the maintenance pattern may also indicate that after sending the "EFFECT_WATER_SQUIRT_ON" signal 902, another signal following that signal is to be sent to deactivate the water squirt effect, e.g., an "EFFECT_WATER_SQUIRT_OFF" signal 906. Similarly, for the "EFFECT_NECK_AIR_ON" signal 904, the maintenance pattern may also indicate that another signal (e.g., an "EFFECT_NECK_AIR_OFF" signal 908) is to be sent to deactivate the neck air effect.

By indicating timed signals for deactivating the various effects, the maintenance pattern may be able to ensure that the effects can be tested without causing damage to the components that generate the effects. For example, as discussed above, some of the physical effects may be generated using a solenoid valve that releases a pressurized air to cause the effect. If the pressurized air is released for an extended period of time without the valve being closed, the pressure may be depleted and the effect may no longer function. By sending signals that deactivate the effect within an acceptable period of time (e.g., on the order of microseconds) after the activation of the signal, the maintenance pattern may ensure that the physical effects are tested without causing damage.

Since the components that generate the physical effects may typically be placed physically apart from the show control device 302, mechanisms that allow the direct activation of the effects would traditionally require at least two people to perform maintenance: one person situated at the show control device 302 to activate the effect, and the other person situated at the location of where the physical effect is generated to verify that the physical effect is operating properly.

By providing a mechanism that allows the physical effects to be activated in a staggered manner, fewer theatre personnel may be required to conduct maintenance on the theatre. For example, a single person may be able to start execution of the maintenance pattern. Once started, the same person may be able to walk from physical effect to physical effect during the delays indicated in the maintenance pattern, so that he/she can be physically present at the physical effect to verify its proper operation when the physical effect is activated.

To allow for efficient testing of physical effects that are provided by a seat assembly 200, the maintenance pattern may be able to indicate that the physical effects of a seat can be activated in a staggered manner for different seats (or different groups of seats). This may allow theatre personnel to walk from seat to seat (or from one group of seats to another group of seats) to ensure that the physical effect(s) are functioning properly for all seats in the theatre. In the context of FIG. 8, the first effect discussed at step 810 can be considered as being provided by a first seat assembly located in one part of the theatre, and the second effect discussed at step 820 can be considered as being provided by a second seat assembly located in a different part of the theatre. In various embodiments, the first effect and the second effect can include the same physical effect.

For example, a maintenance pattern may indicate that a first group of seats should activate its "Leg Tickler" effect for five seconds. After five seconds has elapsed, the maintenance pattern may indicate that the "Leg Tickler" effect should be deactivated for that first group of seats. The maintenance pattern may then indicate that a second group of seats should activate its "Leg Tickler" effect for five seconds. After the five second period has elapsed, the maintenance pattern may indicate that the "Leg Tickler" effect should be deactivated for that second group of seats. In this manner, the "Leg Tickler" effect for any given seat is only activated for five seconds at a time. As indicated above, this may ensure that the pressurized source for producing the effect is not depleted, and that no damage is caused to the components that generate the "Leg Tickler" effect for each seat.

In various embodiments, the maintenance pattern may be created when the show control device 302 is being installed at a theatre. For example, since the exact positioning of the various components in the theatre may depend on the layout of the theatre itself, installation personnel may work with theatre personnel to generate a maintenance pattern that is suitable for the theatre personnel to adequately test the various effects in the theatre.

Figure 10:
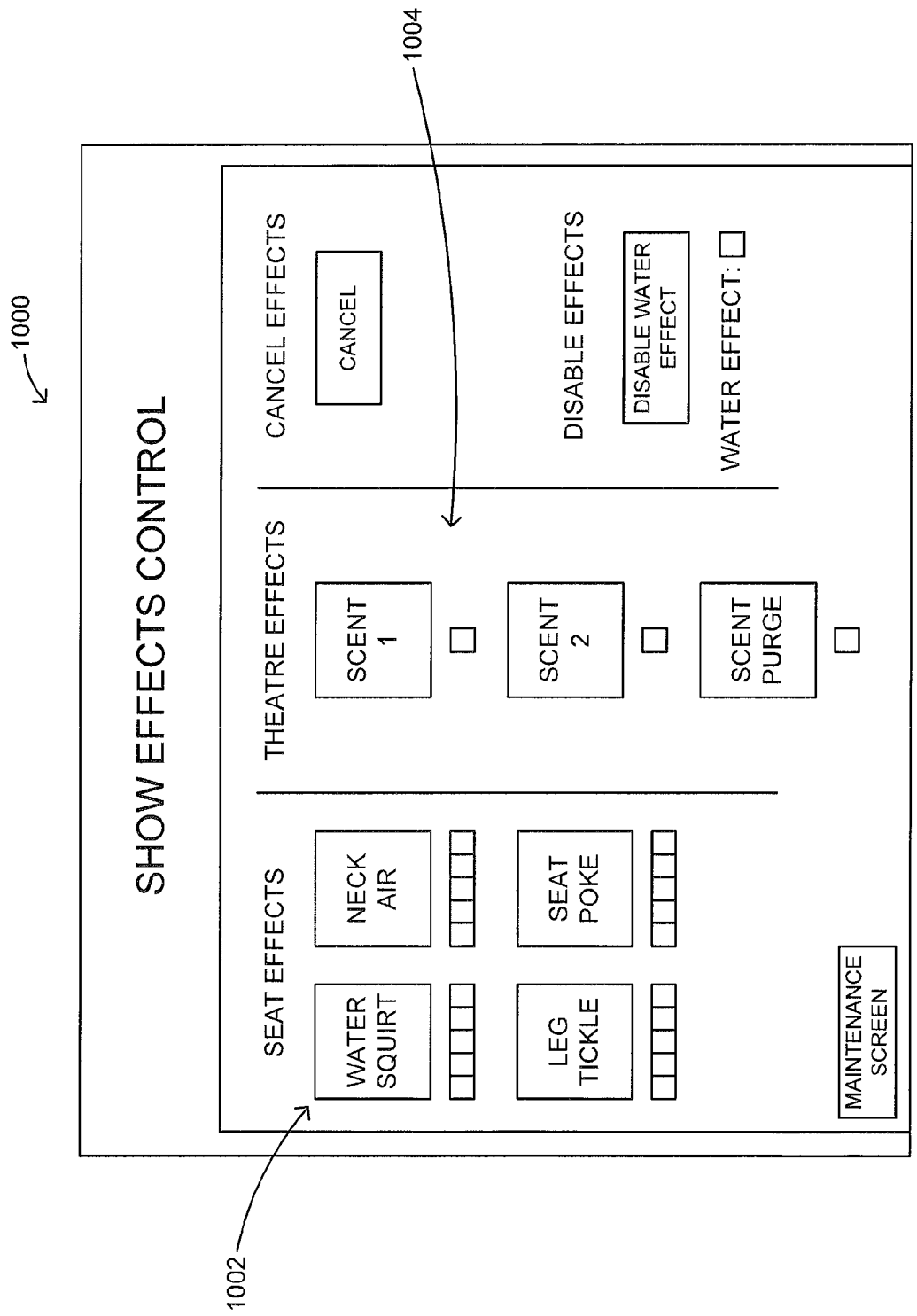
FIGS. 10 and 11 are example screenshots of a user interface that allows for direct activation of physical effects, in accordance with at least one example embodiment.
Figure 11:
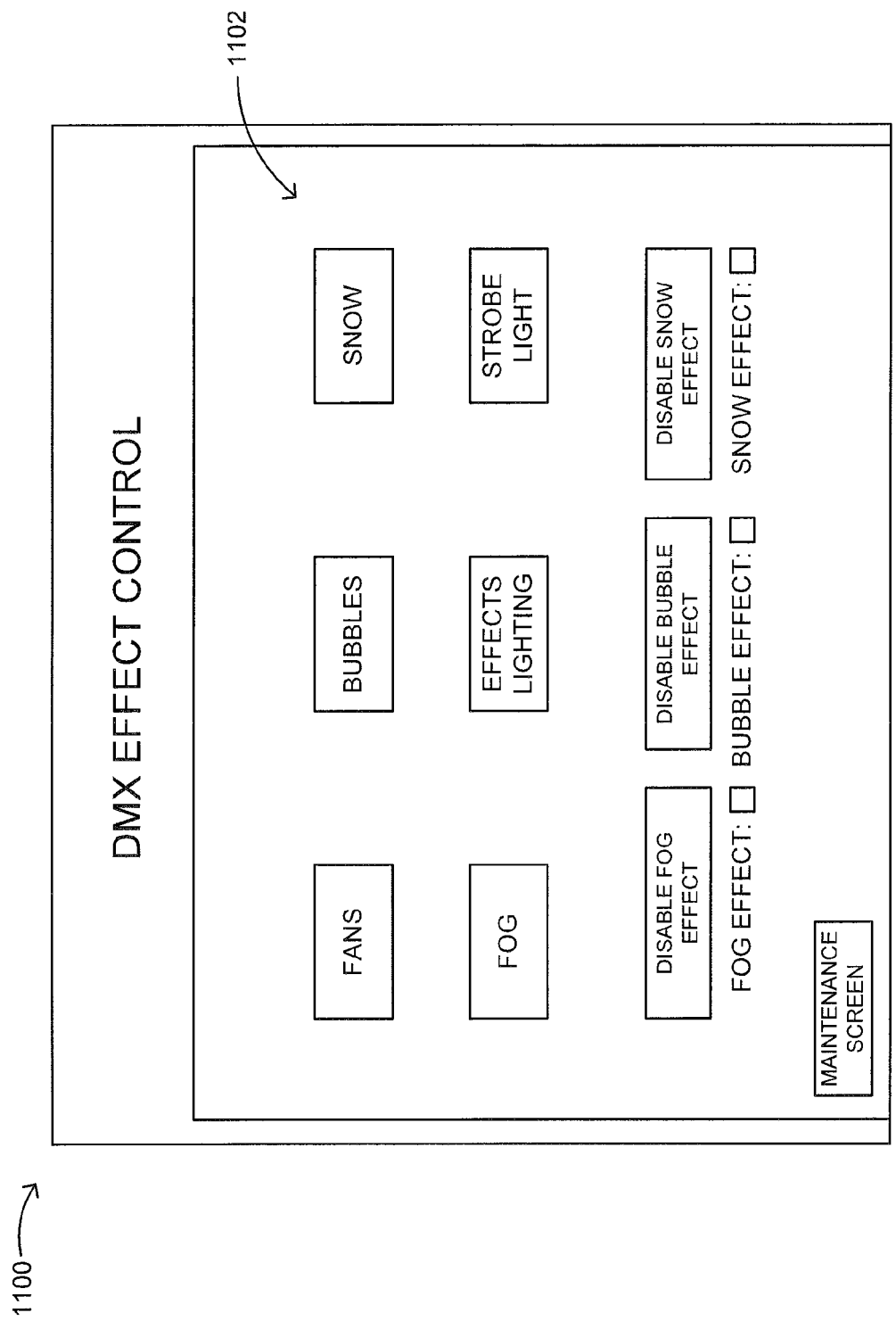

Referring to FIGS. 10 and 11, shown there as 1000 and 1100 respectively are example screenshots of a user interface that allows for direct activation of physical effects, in accordance with at least one example embodiment. In addition to allowing theatre personnel to perform maintenance according to a maintenance pattern, the show control device 302 may also provide a user interface that allows theatre personnel to directly activate the various effects in the theatre.

Referring first to FIG. 10, shown generally as 1000 is an example user interface that allows various seat effects and scent effects to be tested. For example, the user interface 1000 may be provided with controls (e.g., buttons) that may be selected to activate the indicated effect. As illustrated, there may be seat activation controls 1002 for activating the "water squirt", "neck air", "leg tickle", and "seat poke" effects. Similarly, there may be multiple scent activation controls 1004 that when selected cause "scent 1" or "scent 2" to be released. There may also be a control to "scent purge", which purges the scent from the theatre.

Referring now to FIG. 11, shown generally as 1100 is an example user interface that allows various in-theatre effects to be tested. As discussed above with respect to FIG. 3, the connection between a show control device 302 and various machines or lighting may be via a DMX connection. The example user interface may thus indicate that this user interface is for "DMX Effect Control". As illustrated, the user interface 1100 may provide various controls 1102 to activate the indicated machines/lights. Specifically, the user interface may provide buttons that, when selected, activate the "fans" effect, the "bubbles" effect, the "snow" effect, the "fog" effect, as well as the "strobe light" and "effects lighting".

In various embodiments, the user interfaces of FIGS. 10 and 11 may have controls that allow effects to be disabled so that when media containing data to activate these effects are processed by the show control device 302, the effects may be prevented from being activated. For example, FIG. 10 contains an option to disable water effects, and FIG. 11 contains an option to disable the fog, bubble and snow effects.

General Control of a Theatre when Playing a Show

Figure 12:
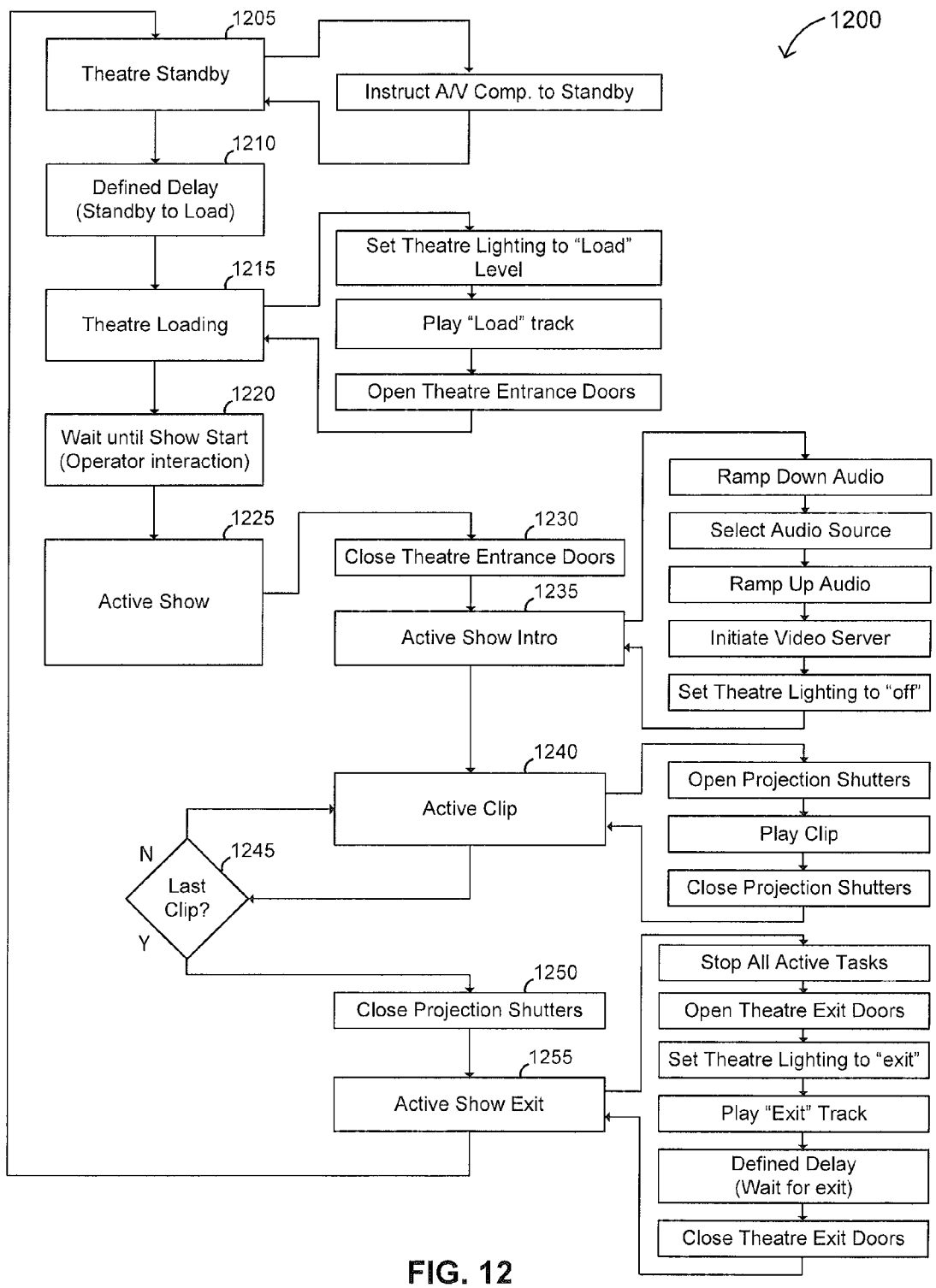
FIG. 12 is a flowchart diagram showing the steps taken by the show control device of the present disclosure during regular playing of a show, in accordance with at least one example embodiment.

Referring to FIG. 12, shown there generally as 1200 is a flowchart diagram showing the steps taken by the show control device of the present disclosure during regular playing of a show, in accordance with at least one example embodiment. When discussing the steps shown in FIG. 12, reference will simultaneously be made to various components shown in FIG. 3.

At step 1205, the theatre may be in a "standby" mode. During this phase, the show control device 302 may send a signal to the A/V component 352 to instruct it to standby.

At step 1210, the show control device 302 may be configured to pause for a predetermined period of time while it is in standby mode.

At step 1215, the show control device 302 may proceed to the "theatre loading" phase. During this phase, the show control device 302 may communicate with the dimmer control 384 to dim the theatre lighting 386 to a "load" level that is suitable for the loading of audience members into the theatre. In various embodiments, the "load" level lighting is set to be softer lighting to create a more welcoming environment.

The show control device 302 may also instruct the A/V component 352 to play a track (e.g., video or audio) predetermined as being suitable for loading. For example, the "load" track that is played by the show control device 302 may be the media clip selected for the "load clip" of a created show (such as may be identified using the user interface shown in FIG. 6).

The show control device 302 may then further communicate with the door control 382 to open the theatre entrance doors.

At step 1220, the show control device 302 may await user input (e.g., the "operation interaction") to indicate that a show is to be started. During this waiting period, the "load" track identified during the theatre loading phase in 1215 may loop.

At step 1225, the show control device 302 may enter the "active show" phase after it receives the user input to indicate that a show is to be started.

At step 1230, the show control device 302 may communicate with the door control 382 to close the theatre entrance doors. After the theatre entrance doors have been closed, the show control device 302 may proceed to the "active show intro" phase at step 1235.

When introducing the active show during step 1235, the show control device 302 may send signals to ramp down the audio, and select an appropriate audio source for the introduction of the active show. The selection of the audio source may, for example, be from a media player (e.g., a Blu-Ray disc player) that is separate from a dedicated video server storing the active show. After the audio source is selected, the show control device 302 may send signals to ramp up the audio and initiate the video server (e.g., the QuVIS™ Cinema Player). The show control device 302 may then send signals to the dimmer control 384 to shut off the theatre lighting.

After the introduction is complete, the show control device 302 may start playing the active show. As discussed above, a show may be created by selecting a number of media clips, and indicating the order in which the media clips should be played. As such, playing an active show may consist of playing the series of selected clips for the active show. When playing a particular active clip, the show control device 302 may proceed to the "active clip" phase at step 1240.

During this phase, the show control device 302 may send a signal to the projector(s) 104 to open its shutters. The show control device 302 may then send a signal to the A/V component 352 to play the particular clip. Afterwards, the show control device 302 may send a signal to the projector(s) 104 to close its shutters. As discussed above, when playing two consecutive active media clips, the opening and closing of the shutters may only need to occur if there is a transition in the frame rates between the two media clips.

At step 1245, the show control device 302 may determine whether the last clip in the active show has been played. If not (the 'N' branch), the show control device 302 may proceed to play the next show indicated in the active show, and the show control device 302 may enter the active clip phase again and repeat step 1240. If the last clip has been reached (the 'Y' branch), then the show control device 302 may proceed to close the projection shutters at step 1250.

At step 1255, the show control device 302 may then proceed to the "active show exit" phase. During this phase, the show control device 302 may stop all active tasks. The show control device 302 may send a signal to the door control 382 to open the theatre exit doors, and then also send a signal to the dimmer control 384 to set the theatre lighting to a level that is suitable for when an audience exits the theatre. In contrast to the "load" lighting level discussed above with respect to step 1215, the "exit" level can be brighter, and less warm, so as to encourage audience members to depart the theatre.

As well, the show control device 302 may also select a predetermined "exit" track to be played while awaiting a predetermined delay period (e.g., when the audience members are departing). For example, the "exit" track that is played by the show control device 302 may be the media clip selected for the "exit clip" of a created show (such as may be identified using the user interface shown in FIG. 6). When the predetermined delay period is over, the show control device 302 may then send a signal to close the theatre exit doors.

While not illustrated in FIG. 12, it will be understood that prior to playing the exit track, the show control device 302 may have played an "exit spiel" clip had one been selected for the active show (e.g., using the user interface shown in FIG. 6).

If the active show is to be played again, the process may then repeat from the beginning at step 1205. As indicated previously, the period between the ending of a show and the restarting of a show may be considered to be the "standby" period or "rollover time". While not illustrated in FIG. 12, during this period, the show control device may play a "standby" clip if one has been selected for the active show (e.g., as may have been selected using the user interface shown in FIG. 6)

The systems and methods disclosed herein are presented only by way of example and are not meant to limit the scope of the subject matter described herein. Other variations of the systems and methods described above will be apparent to those in the art and as such are considered to be within the scope of the subject matter described herein. For example, it should be understood that acts and the order of the acts performed in the processing described herein may be altered, modified and/or augmented yet still achieve the desired outcome.

For example, the steps of a method in accordance with any of the embodiments described herein may be performed in any order, whether or not such steps are described in the claims, figures or otherwise in any sequential numbered or lettered manner. Also, in the various user interfaces illustrated in the figures, it will be understood that the illustrated user interface text and controls are provided as examples only and are not meant to be limiting. Other suitable user interface elements may be possible.

As used herein, the wording "and/or" is intended to represent an inclusive-or. That is, "X and/or Y" is intended to mean X or Y or both. Moreover, "X, Y, and/or Z" is intended to mean X or Y or Z or any combination thereof.

The invention claimed is:

1. A system for controlling a physical effect in a theatre, the system comprising:
   an audio/video (A/V) component, the A/V component being capable of processing A/V media that is associated with data indicating when the physical effect should be activated;
   a show control device communicably linked to the A/V component, the show control device being capable of translating the data into one or more signals that are capable of causing the physical effect to be activated; and
   a control assembly communicably linked to the show control device, the control assembly capable of receiving the one or more signals and activating the physical effect in response,
   wherein the show control device further comprises a processor and a memory storing instructions which, when executed by the processor, cause the processor to:
   identify a plurality of media clips that are capable of being played in a theatre;
   provide a user interface that allows a first selection of the plurality of media clips to be included in a first show that is to be shown in the theatre;
   receive, via the user interface, input that indicates an order in which the first selection of media clips are to be played during the first show; and
   store data indicating that the first selection of media clips, when played in the indicated order, forms the first show that is to be shown in the theatre.

2. The system of claim 1, wherein the physical effect is generated by a pressurized source, and the control assembly comprises a valve configured to release contents of the pressurized source in response to the one or more signals.

3. The system of claim 2, wherein the contents of the pressurized source comprises one selected from the group consisting of: air and water.

4. The system of claim 2, wherein the one or more signals are adapted to release the contents of the pressurized source for a predetermined period of time, and wherein the predetermined period of time is selected according to the physical effect.

5. The system of claim 1, wherein the physical effect is provided by a seat assembly capable of imparting motion to a subject seated on the seat assembly.

6. The system of claim 1, wherein when the data indicates that the physical effect is to be activated in synchronization with the A/V media.

7. The system of claim 1, wherein the user interface is further configured to allow a second selection of the plurality of media clips to be included in a second show that is to be shown in the theatre.

8. The system of claim 7, wherein the first selection and the second selection contain the same media clip, such that the same media clip is played when each of the first show and the second show is shown in the theatre.

9. The system of claim 1, wherein the processor is further configured to:
   provide a user interface that allows the first show to be selected, from a plurality of different shows, to be shown in the theatre.

10. The system of claim 1, wherein the processor is further configured to:
    identify a plurality of additional media clips that can be played during a loading period for the first show; and
    wherein the user interface is further configured to allow selection of one or more of the additional media clips for playing during the loading period of the first show.

11. The system of claim 1, wherein the processor is further configured to:
    identify a plurality of additional media clips that can be played during an exiting period of the first show; and
    wherein the user interface is further configured to allow selection of one or more of the additional media clips for playing during the exiting period of the first show.

12. The system of claim 1, wherein the processor is further configured to:
    identify a plurality of additional media clips that can be played when the first show is on standby; and
    wherein the user interface is further configured to allow selection of one or more of the additional media clips for playing when the first show is on standby.

13. The system of claim 1, wherein the user interface is further configured to receive input indicating that there is a difference between the frame rates for any two media clips that are to be played consecutively during the first show.

14. The system of claim 1, wherein the theatre is capable of providing a physical effect, and at least one of the plurality of media clips is associated with data indicating when the physical effect should be activated.

15. The system of claim 14, wherein the physical effect comprises one selected from a group consisting of: a water squirt, an air blast, and a scent release.

16. A show control device for facilitating maintenance of a plurality of components that provide effects in a theatre, the show control device comprising a processor and a memory storing instructions which, when executed by the processor, cause the processor to:
    identify a maintenance pattern that indicates a sequence of signals to be transmitted by the show control device;
    according to the maintenance pattern, send a first signal to activate a first effect in the theatre;
    delay sending a second signal to activate a second effect in the theatre, wherein the duration of the delay is determined according to the maintenance pattern; and
    after the delay, send the second signal to activate the second effect in the theatre.

17. The show control device of claim 16, wherein each signal of the sequence of signals is associated with a respective timecode that indicates when the signal should be transmitted by the show control device.

18. The show control device of claim 17, wherein each timecode is stored in a format corresponding to a period of time that has elapsed after starting execution of the maintenance pattern.

19. The show control device of claim 17 wherein the duration of the delay is determined according to a difference between a timecode for the second signal and a timecode for the first signal.

20. The show control device of claim 16, wherein at least one of the effects comprises a physical effect.

21. The show control device of claim 20, wherein the physical effect comprises one selected from a group consisting of: a water squirt, an air blast, and a scent release.

22. The show control device of claim 16, wherein the first effect is provided by a first seat assembly located in one part of the theatre, and the second effect is provided by a second seat assembly located in a different part of the theatre.

23. The show control device of claim 22, wherein the first effect and the second effect comprise the same physical effect.

24. The show control device of claim 16, wherein the processor is further configured to:
  after sending the first signal, send a third signal to deactivate the first effect in the theatre.

25. The show control device of claim 16, wherein the processor is further configured to:
  after sending the second signal, send a fourth signal to deactivate the second effect in the theatre.

* * * * *